United States Patent
Canepa et al.

(10) Patent No.: US 10,061,727 B2
(45) Date of Patent: *Aug. 28, 2018

(54) ENHANCED QUEUE MANAGEMENT

(71) Applicant: Seagate Technology LLC, Cupertino, CA (US)

(72) Inventors: Timothy Lawrence Canepa, Los Gatos, CA (US); Earl T. Cohen, Oakland, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,852

(22) Filed: Aug. 24, 2016

(65) Prior Publication Data
US 2017/0052912 A1 Feb. 23, 2017

Related U.S. Application Data

(63) Continuation of application No. 14/209,028, filed on Mar. 13, 2014, now Pat. No. 9,436,634.

(60) Provisional application No. 61/786,073, filed on Mar. 14, 2013.

(51) Int. Cl.
| | |
|---|---|
| G06F 13/36 | (2006.01) |
| G06F 13/362 | (2006.01) |
| G06F 13/364 | (2006.01) |
| G06F 13/16 | (2006.01) |
| G06F 3/06 | (2006.01) |
| G06F 13/42 | (2006.01) |
| G06F 13/00 | (2006.01) |

(52) U.S. Cl.
CPC .......... *G06F 13/362* (2013.01); *G06F 3/0611* (2013.01); *G06F 3/0659* (2013.01); *G06F 3/0688* (2013.01); *G06F 13/1642* (2013.01); *G06F 13/364* (2013.01); *G06F 13/4282* (2013.01)

(58) Field of Classification Search
CPC .................................. G06F 13/00; G06F 13/36
USPC ........................ 710/310, 112, 52; 711/147
See application file for complete search history.

(56) References Cited

U.S. PATENT DOCUMENTS 9,436,634 B2 * 9/2016 Canepa ................. G06F 13/364

* cited by examiner

*Primary Examiner* — Christopher Shin
(74) *Attorney, Agent, or Firm* — Cesari & Reed, LLP; Kirk A. Cesari

(57) ABSTRACT

A paired queue apparatus and method comprising request and response queues wherein queue head and tail pointer update values are communicated through an enhanced pointer word data format providing pointer indicator information and optional auxiliary information in a single transfer, wherein auxiliary information provides additional system communication without consuming additional bandwidth. Auxiliary information is optionally contained in a response data entry written to a response queue or in a request entry written to a request queue.

20 Claims, 16 Drawing Sheets

ENHANCED QUEUE MANAGEMENT

CROSS REFERENCE TO RELATED APPLICATIONS

This Application claims priority to and is a continuation of U.S. patent application Ser. No. 14/209,028 titled "ENHANCED QUEUE MANAGEMENT", and filed Mar. 14, 2014, which claims priority to U.S. Provisional Application No. 61/786,073 titled "ENHANCED QUEUE MANAGEMENT" and filed Mar. 14, 2013, the contents of both of which are hereby incorporated by reference in their entireties.

BACKGROUND

Field

The disclosed embodiments are related to electronic systems and more specifically to queues and efficient and flexible management thereof.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

In some computing system embodiments, a storage subsystem comprises a host bus adapter coupled via a host bus interface to a controller of a mass storage device. Request and response queues are used to respectively provide tasks to the controller and receive completion status from the controller. These queues have head and tail pointers that are repeatedly updated as the queues are processed and managed. In some embodiments the queue pointer updates are communicated via data words exchanged between the host bus adapter and the mass storage device controller via one or more predetermined storage locations. The granularity of the data words is that of the native data width of the system. The inventors believe they are the first to observe that: the queue pointer updates can be performed using a fraction of the data word width; and that auxiliary storage subsystem control information can be advantageously conveyed (between the host bus adapter and the mass storage device controller) using the remaining fraction (balance) of the data word width, at low latency compared with control information conveyed via the request and response queues, and without consuming any additional system infrastructure or other resources (such as storage locations, or data transfers) beyond those already required by the queue pointer update information. While the foregoing describes a specific application embodiment, the inventors believe the technique has broader applicability as other embodiments will illustrate throughout the following description.

List of Reference Symbols in Drawings

Figure 1A:
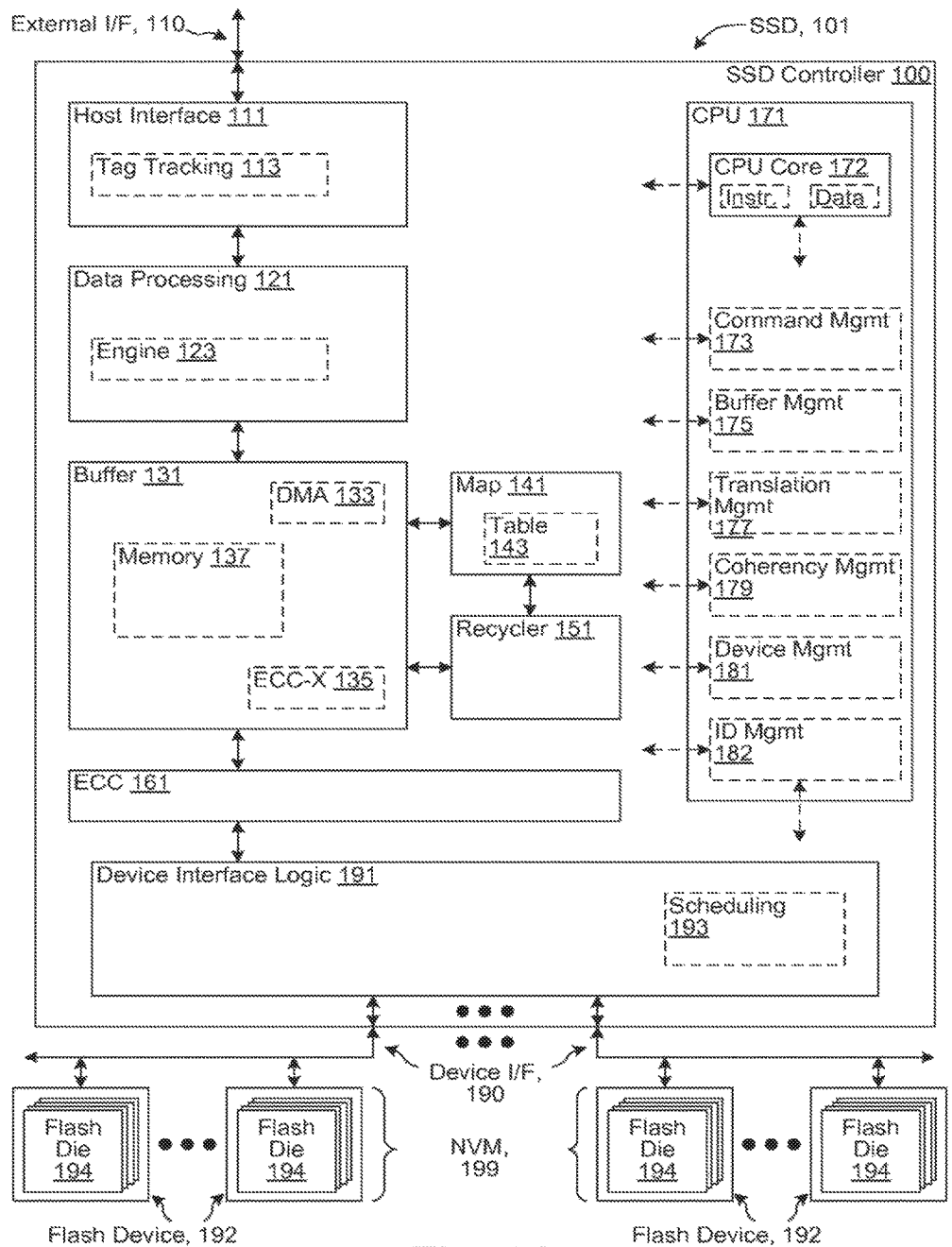
FIG. 1A illustrates, via block diagram, selected details of an embodiment of a Solid-State Disk (SSD) including an SSD controller compatible with operation in an I/O device (such as an L/O storage device) enabled for interoperation with a host (such as a computing host).

| Ref. Symbol | Element Name |
|---|---|
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 108 | Shadow Map |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 112H | Host Memory |
| 113 | Tag Tracking |
| 114 | Multi-Device Management Software |
| 115 | Host Software |
| 116 | I/O Card |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interfaces |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 200 | Paired queues |
| 210 | Request queue |
| 212 | Request queue |
| 214 | Request queue |
| 216 | Request queue head pointer |
| 218 | Request queue tail pointer |
| 220 | Response queue |
| 222 | Response queue |
| 224 | Response queue |
| 226 | Response queue head pointer |
| 228 | Response queue tail pointer |
| 230 | Enhanced pointer word |
| 300 | Enhanced request queue entry |
| 310 | Enhanced response queue entry |
| 420 | An exemplary enhanced pointer word format |
| 430 | An exemplary enhanced pointer word format |
| 440 | An exemplary enhanced pointer word format |
| 450 | An exemplary enhanced pointer word fomat |
| 500 | An exemplary method of host updating of queue pointers |
| 510 | Program |
| 520 | EPW Available? |
| 521 | No |
| 522 | Yes |
| 530 | Access EPW |
| 540 | Auxiliary Information Available? |
| 541 | No |
| 542 | Yes |
| 550 | Process Auxiliary Information |
| 560 | Updated Request Queue Head? |
| 561 | No |
| 562 | Yes |
| 570 | Update Request Queue Head Pointer |
| 580 | Updated Response Queue Tail Pointer? |
| 581 | No |
| 582 | Yes |
| 590 | Update Response Queue Tail Pointer |
| 600A | Selected details of an exemplary embodiment of a procedure for host generation of enhanced pointer words (EPWs) associated with issuing tasks. |
| 610 | Program |
| 615 | Tasks to be issued? |
| 616 | No |
| 617 | Yes |
| 620 | Locations Available? |
| 621 | No |
| 622 | Yes |
| 625 | Add Task Word(s) to Request Queue |
| 630 | Adjust Request Queue Tail Pointer |
| 635 | Form Tail Pointer Indicator |
| 640 | Auxiliary Info to be Included? |
| 641 | No |
| 642 | Yes |
| 645 | Combine Tail Pointer Indicator and Auxiliary Info |
| 646 | Convey to Controller |
| 600B | Selected details of an exemplary embodiment of a procedure for host generation of enhanced pointer words (EPWs) associated with processing controller responses. |
| 650 | Available Responses? |
| 651 | No |
| 652 | Yes |
| 655 | Retrieve Response Word(s) from Response Queue |
| 660 | Adjust Response Queue Head Pointer Value |
| 665 | Form Head Pointer Indicator |
| 670 | Auxiliary Info Available? |
| 671 | No |
| 672 | Yes |
| 680 | Combine Head Pointer Indicator and Auxiliary Info |
| 690 | Convey EPW to Controller |
| 700 | Selected details of an exemplary embodiment of a procedure for host updating of queue pointers. |
| 710 | Program |
| 720 | EPW Available? |
| 721 | No |
| 722 | Yes |
| 730 | Access EPW |
| 740 | Auxiliary Information Available? |
| 741 | No |
| 742 | Yes |
| 750 | Process Auxiliary Information |
| 760 | Updated Respone Queue Head? |
| 761 | No |
| 762 | Yes |
| 770 | Update Response Queue Head Pointer |
| 780 | Updated Request Queue Tail? |
| 781 | No |
| 782 | Yes |
| 790 | Update Request Queue Tail Pointer |
| 800A | Selected details of an exemplary embodiment of a procedure for controller generation of enhanced pointer words (EPWs) associated with controller issuing of responses. |
| 810 | Program |
| 815 | Responses to be issued? |
| 816 | No |
| 817 | Yes |
| 820 | Locations Available? |
| 821 | No |
| 822 | Yes |

-continued

List of Reference Symbols in Drawings

| Ref. Symbol | Element Name |
|---|---|
| 825 | Add Response Word(s) to Response Queue |
| 830 | Adjust Response Queue Tail Pointer |
| 835 | Form Tail Pointer Indicator |
| 840 | Auxiliary Info to be Included? |
| 841 | No |
| 842 | Yes |
| 845 | Combine Tail Pointer Indicator and Auxiliary Info |
| 846 | Convey to Host |
| 800B | Selected details of an exemplary embodiment of a procedure for controller generation of enhanced pointer words (EPWs) associated with controller processing of task requests. |
| 850 | Task Requests Available? |
| 851 | No |
| 852 | Yes |
| 855 | Retrieve Task Word(s) from Request Queue |
| 860 | Adjust Request Queue Head Pointer Value |
| 865 | Form Head Pointer Indicator |
| 870 | Auxiliary Info Available? |
| 871 | No |
| 872 | Yes |
| 880 | Combine Head Pointer Indicator and Auxiliary Info |
| 890 | Convey EPW to Host |
| 900 | Selected details of an exemplary embodiment of a procedure for host utilization of enhanced pointer words (EPWs). |
| 910 | Receive Data Request |
| 920 | Place Task Request in Request Queue |
| 930 | Output EPW to Update Request Queue Tail Pointer |
| 940 | Receive New Data Request |
| 950 | Place New Task Request in Request Queue |
| 960 | Output EPW to Alter Controller Task Processing |
| 1000 | Selected details of an exemplary embodiment of a procedure for controller utilization of enhanced pointer words (EPWs). |
| 1010 | Retrieve First Request Queue Entry |
| 1020 | Process Task According to First Configuration |
| 1030 | Output EPW to Update Request Queue Head Pointer |
| 1040 | Access EPW |
| 1050 | Process Auxiliary Information |
| 1060 | Retrieve Second Request Queue Entry |
| 1070 | Process Task According to Second Configuration |
| 1100 | Selected details of an exemplary embodiment of a procedure for controller utilization of enhanced queue entries. |
| 1110 | Retrieve Request Queue Entry |
| 1120 | Parse Auxiliary Information |
| 1130 | Parse Task Information |
| 1140 | Process Task |
| 1150 | Update Request Queue Head Pointer Value |
| 1160 | Obtain Task Status |
| 1170 | Combine Task Status and Head Pointer Information |
| 1180 | Write to Response Queue |
| 1190 | Procss Auxiliary Information |
| 1200A | Selected details of an exemplary embodiment of a procedure for host utilization of enhanced queue entries. |
| 1210 | Retrieve Response Queue Entry |
| 1220 | Parse Auxiliary Information |
| 1225 | Process Auxiliary Information |
| 1230 | Update Response Queue Head Pointer Value |
| 1240 | Parse Task Status Information |
| 1250 | Process Task Status Information |
| 1200B | Selected details of an exemplary embodiment of a procedure for host creation of enhanced queue entries. |
| 1260 | Create Task |
| 1270 | Combine Task and Auxiliary Information |
| 1280 | Write to Request Queue |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In some embodiments, an I/O device such as a Solid-State Disk (SSD) is coupled via a host interface to a host computing system, also simply herein termed a host. According to various embodiments, the coupling is via one or more host interfaces including PCIe, SATA, SAS, USB, Ethernet, Fibre Channel, or any other interface suitable for coupling two electronic devices. In further embodiments, the host interface includes an electrical signaling interface and a host protocol. The host protocol defines standard commands for communicating with the I/O device, including commands that send data to and receive data from the I/O device.

According to various embodiments, some host interfaces are compatible with one or more of a USB interface standard, a CF interface standard, an MMC interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game. In some embodiments, an interfacing host (such as an SAS/SATA bridge) operates as a computing host and/or as a bridge to a computing host. In some embodiments the host includes a host bus adapter (HBA). The HBA implements the host interface and according to embodiment off-loads and accelerates host interface and other host-side functionality related to interactions with the I/O device.

In various embodiments, the SSD controller includes one or more processors. The one or more processors execute firmware to control and/or perform operation of the SSD controller. The SSD controller communicates with the computing host (such as via the HBA of the host) to send and receive commands and/or status as well as data. The computing host executes one or more of an operating system, a driver, and an application. Communication by the computing host with the SSD controller is optionally and/or selectively via one or more of the HBA, the driver, and/or the application. In a first example, communication to the SSD controller is generally via the driver, and the application provides higher-level commands to the driver that the driver translates into specific commands for the HBA and/or SSD controller. In a second example, the driver implements a bypass mode and the application is enabled to send specific commands to the HBA and/or SSD controller via the driver. In a third example, a PCIe SSD controller supports one or more Virtual Functions (VFs), enabling an application, once configured, to communicate directly with the HBA and/or SSD controller, bypassing the driver.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

Controller Parsing of EPWs and Enhanced Queue Entries to Obtain Auxiliary Information EC1) An I/O device controller for an I/O device, the I/O device controller comprising:
a programmable processor;
interface circuitry enabled to communicate queue pointer update information related to the I/O device via data words of a processor-native-word-size granularity exchanged with a host via one or more predetermined storage locations; and
wherein the processor uses an enhanced data word format comprising partitioning the data words into a basic portion enabled to convey the queue pointer update information and an enhanced portion enabled to convey auxiliary I/O device sub-system control information;
wherein the use of the enhanced data word format enables the auxiliary I/O device sub-system control information to be exchanged between the host and the I/O device controller, with the same rate and latency as queue pointer updates, and without requiring additional data exchanges or additional storage locations.

EC2) An I/O device controller comprising:
a programmable processor;
interface circuitry operable to access a request queue; and
wherein the processor is adapted to retrieve a single enhanced queue entry from the queue and to parse the queue entry to obtain a first portion having task information and a second portion having auxiliary information.

EC3) The I/O device controller of EC1 or EC2, wherein the auxiliary information comprises indicator information for at least one other queue pointer.

EC4) The I/O device controller of EC1 or EC2, wherein the auxiliary information comprises priority information indicating a priority for at least one of a plurality of task requests or task request queues.

EC5) The I/O device controller of EC1 or EC2, wherein the auxiliary information indicates that a requested task is to be aborted.

EC6) The I/O device controller of EC1 or EC2, wherein the auxiliary information indicates that a plurality of task requests are to be performed atomically.

EC7) The I/O device controller of EC1 or EC2, wherein the auxiliary information indicates that a task is asynchronous and is to be performed after an isochronous request.

EC8) The I/O device controller of EC1 or EC2, wherein the auxiliary information comprises an arbitration weight for one or more queues.

EC9) The I/O device controller of EC1 or EC2, wherein the auxiliary information includes credit information associated with at least one queue of a plurality of queues to control processing of tasks from the plurality of queues.

EC10) The I/O device controller of EC1 or EC2, wherein the auxiliary information comprises a queue full or queue nearly full message.

EC11) The I/O device controller of EC1 or EC2, wherein the auxiliary information comprises an indicator of an updated pointer available in a predefined memory location.

EC12) The I/O device controller of EC1 or EC2, wherein the auxiliary information alters an arbitration method among a plurality of queues.

EC13) The I/O device controller of EC1 or EC2, wherein the auxiliary information specifies that information associated with a task should be encrypted.

EC14) The I/O device controller of EC1 or EC2, wherein the auxiliary information selects an encryption method.

EC15) The I/O device controller of EC1 or EC2, wherein the auxiliary information specifies a data transfer format.

EC16) The I/O device controller of EC1 or EC2, wherein the auxiliary information specifies at least in part the manner in which a task should be performed.

EC17) The I/O device controller of EC1 or EC2, wherein the auxiliary information indicates that one of a plurality of queues should be service next or should be skipped on its next selection.

EC18) The I/O device controller of EC1 or EC2, wherein the auxiliary information defines a frequency of servicing for a plurality of queues.

EC19) The I/O device controller of EC1 or EC2, wherein the auxiliary information specifies an interval for pointer updates.

EC20) The I/O device controller of EC1 or EC2, wherein the auxiliary information specifies that a specified number of interrupts are to be aggregated.

EC21) The I/O device controller of EC1 or EC2, wherein the auxiliary information comprises a phase bit to indicate that one or more entries have been added to a request queue.

EC22) The I/O device controller of EC1 or EC2, wherein the auxiliary information indicates an association between two or more queue entries.

EC23) The I/O device controller of EC1 or EC2, wherein the auxiliary information indicates a service group for a queue, either above or below the service group it was previously in.

EC24) The I/O device controller of EC1 or EC2, wherein the auxiliary information comprises a bit-map of queues to service at least once prior to servicing a first queue again.

EC25) The I/O device controller of EC or EC2, wherein the auxiliary information specifies or changes an interval between or threshold for response notifications (EPWs) to a host for an associated response queue.

EC26) The I/O device controller of EC1 or EC2, wherein the auxiliary information comprises information grouping at least two task requests to be processed in a predefined manner.

EC27) The I/O device controller of EC1 or EC2, wherein the I/O device controller is an SSD controller, the interface circuitry is compatible with at least on version of a PCIe host interface standard, and the SSD controller is coupled to non-volatile mass storage.

Host Generation of EPWs and Enhanced Queue Entries

EC28) A host bus adapter comprising:
a programmable processor;
interface circuitry operable to individually access a plurality of memory locations configured as a queue; and
wherein the processor is adapted to write an enhanced queue entry to at least one memory location of the queue, the entry having a first portion containing task information and having a second portion containing auxiliary information.

EC29) A hose bus adapter comprising:
a programmable processor;
interface circuitry operable to access a memory location or register configured as a pointer location; and
wherein the processor is adapted to write a single word to the pointer location, the word having a first portion containing pointer information and having a second portion containing auxiliary information.

EC30) The host bus adapter bus adapter of EC28 or EC29, wherein the auxiliary information comprises indicator information for a queue pointer.

EC31) The host bus adapter bus adapter of EC28 or EC29, wherein the auxiliary information comprises priority information indicating a priority for at least one of a plurality of task requests or task request queues.

EC32) The host bus adapter bus adapter of EC28 or EC29, wherein the auxiliary information indicates that a previously requested task is to be aborted.

EC33) The host bus adapter bus adapter of EC28 or EC29, wherein the auxiliary information indicates that a plurality of task requests are to be performed atomically.

EC34) The host bus adapter bus adapter of EC28 or EC29, wherein the auxiliary information indicates that a task is asynchronous and is to be performed after an isochronous request.

EC33) The host bus adapter bus adapter of EC28 or EC29, wherein the auxiliary information comprises an arbitration weight for one or more queues.

EC36) The host bus adapter bus adapter of EC28 or EC29, wherein the auxiliary information includes credit information associated with at least one queue of a plurality of queues to control processing of tasks from the plurality of queues.

EC37) The host bus adapter bus adapter of EC28 or EC29, wherein the auxiliary information comprises a queue full or queue nearly full message.

EC38) The host bus adapter bus adapter of EC28 or EC29, wherein the auxiliary information comprises an indicator of an updated pointer available in a predefined memory location.

EC39) The host bus adapter bus adapter of EC28 or EC29, wherein the auxiliary information alters an arbitration method among a plurality of queues.

EC40) The host bus adapter bus adapter of EC28 or EC29, wherein the auxiliary information specifies that information associated with a task should be encrypted.

EC41) The host bus adapter bus adapter of EC28 or EC29, wherein the auxiliary information selects an encryption method.

EC42) The host bus adapter bus adapter of EC28 or EC29, wherein the auxiliary information specifies a data transfer formal.

EC43) The host bus adapter bus adapter of EC28 or EC29, wherein the auxiliary information specifies at least in part the manner in which a task should be performed.

EC44) The host bus adapter bus adapter of EC28 or EC29, wherein the auxiliary information indicates that one of a plurality of queues should be serviced next or should be skipped on its next selection.

EC45) The host bus adapter bus adapter of EC28 or EC29, wherein the auxiliary information defines a frequency of servicing for a plurality of queues.

EC46) The host bus adapter bus adapter of EC28 or EC29, wherein the auxiliary information specifies an interval for pointer updates.

EC47) The host bus adapter bus adapter of EC28 or EC29, wherein the auxiliary information specifies that a specified number of interrupts are to be aggregated.

EC48) The host bus adapter bus adapter of EC28 or EC29, further comprising mass storage media coupled to the controller.

EC49) The host bus adapter bus adapter of EC28 or EC29, wherein the auxiliary information comprises a phase bit to indicate that one or more entries have been added to a request queue.

EC50) The host bus adapter bus adapter of EC28 or EC29, wherein the auxiliary information indicates an association between two or more queue entries.

EC51) The host bus adapter bus adapter of EC28 or EC29, wherein the auxiliary information indicates a service group for a queue, either above or below the service group it was previously in.

EC52) The host bus adapter bus adapter of EC28 or EC29, wherein the auxiliary information comprises a bit-map of queues to service at least once prior to servicing a first queue again.

EC53) The host bus adapter bus adapter of EC28 or EC29, wherein the auxiliary information specifies or changes an interval between or threshold for response notifications (EPWs) to a host for an associated response queue.

EC54) The host bus adapter of EC28 or EC29, wherein the auxiliary information comprises information grouping at least two task requests to be processed in a predefined manner.

Method of Controller Generation of Task Status EPWs and Task Status Enhanced Queue Entries EC55) A method of paired queue controller operation, the controller having at least read access to a request queue and at least write access to a response queue, the method comprising:
retrieving a task from the head location of the request queue;

processing the task; and writing, to a pointer memory location or register, a single word having task status information and having auxiliary information.

EC56) A method of paired queue controller operation, the controller having at least read access to a request queue and at least write access to a response queue, the method comprising:

retrieving a task from the head location of the request queue;

processing the task; and writing, to the tail of the response queue, a single word having task status information and having auxiliary information.

EC57) The method of EC55 or EC56, wherein the auxiliary information comprises pointer indicator information for the bead location of the request queue.

EC58) The method of EC55 or EC56, wherein the auxiliary information comprises pointer indicator information for the tail location of the response queue.

EC59) The method of EC55 or EC56, wherein the task status information comprises status for a plurality of task requests processed.

EC60) The method of EC55 or EC56, wherein the auxiliary information comprises an indicator of an updated pointer available in a predefined memory location.

EC61) The method of EC55 or EC56, wherein the auxiliary information comprises a queue full or queue nearly full message.

Method of Host Generation of EPWs and Enhanced Queue Entries

EC62) A method of paired queue host operation, the host having at least write access to a request queue and at least read access to a response queue, the method comprising:

writing a task to the tail location of the request queue; and writing, to a pointer memory location or register, a single word having request queue tail location pointer indicator information and auxiliary information.

EC63) A method of paired queue host operation, the host having at least write access to a request queue and at least read access to a response queue, the method comprising:

writing a single word to the tail location of the request queue, the single word comprising a task request and auxiliary information.

Method of Controller Parsing of EPWs and Enhanced Queue Entries

EC64) A method of paired queue controller operation, the controller having at least read access to a request queue and at least write access to a response queue, the method comprising:

retrieving a single task word from the head location of the request queue; and parsing the task word to obtain task information and auxiliary information.

EC65) A method of paired queue controller operation, the controller having at least read access to a request queue and at least write access to a response queue, the method comprising:

retrieving an enhanced pointer word stored in a memory location or register; and parsing the enhanced pointer word to obtain pointer indicator information and auxiliary information.

EC66) The method of EC62, EC63, EC64, or EC65, wherein the auxiliary information comprises pointer indicator information for at least one of: the request queue head location, the request queue tail location, the response queue head location, and the response queue tail location.

EC67) The method of EC62, EC63, EC64, or EC65, wherein the auxiliary information comprises priority information indicating a priority for at least one of a plurality of task requests or task request queues.

EC68) The method of EC62, EC63, EC64, or EC65, wherein the auxiliary information indicates that a requested task is to be aborted.

EC69) The method of EC62, EC63, EC64, or EC65, wherein the auxiliary information indicates that a plurality of task requests are to be performed atomically.

EC70) The method of EC62, EC63, EC64, or EC65, wherein the auxiliary information indicates that a task is asynchronous and is to be performed after an isochronous request.

EC71) The method of EC62, EC63, EC64, or EC65, wherein the auxiliary information comprises an arbitration weight for one or more queues.

EC72) The method of EC62, EC63, EC64, or EC65, wherein the auxiliary information includes credit information associated with at least one queue of a plurality of queues to control processing of tasks from the plurality of queues.

EC73) The method of EC62, EC63, EC64, or EC65, wherein the auxiliary information comprises a queue full or queue nearly full message.

EC74) The method of EC62, EC63, EC64, or EC65, wherein the auxiliary information comprises an indicator of an updated pointer available in a predefined memory location.

EC75) The method of EC62, EC63, EC64, or EC65, wherein the auxiliary information alters an arbitration method among a plurality of queues.

EC76) The method of EC62, EC63, EC64, or EC65, wherein the auxiliary information specifies that information associated with a task should be encrypted.

EC77) The method of EC62, EC63, EC64, or EC65, wherein the auxiliary information selects an encryption method.

EC78) The method of EC62, EC63, EC64, or EC65, wherein the auxiliary information specifics a data transfer format.

EC79) The method of EC62, EC63, EC64, or EC65, wherein the auxiliary information specifies at least in part the manner in which a task should be performed.

EC80) The method of EC62, EC63, EC64, or EC65, wherein the auxiliary information indicates that one of a plurality of queues should be serviced next or should be skipped on its next selection.

EC81) The method of EC62, EC63, EC64, or EC65, wherein the auxiliary information defines a frequency of servicing for a plurality of queues.

EC82) The method of EC62, EC63, EC64, or EC65, wherein the auxiliary information specifies an interval for pointer updates.

EC83) The method of EC62, EC63, EC64, or EC65, wherein the auxiliary information specifies that a specified number of interrupts are to be aggregated.

EC84) The method of EC62, EC63, EC64, or EC65, wherein the auxiliary information comprises a phase bit to indicate that one or more entries have been added to a request queue.

EC85) The method of EC62, EC63, EC64, or EC65, wherein the auxiliary information indicates an association between two or more queue entries.

EC86) The method of EC62, EC63, EC64, or EC65, wherein the auxiliary information indicates a service group for a queue, either above or below the service group it was previously in.

EC87) The method of EC62, EC63, EC64, or EC65, wherein the auxiliary information comprises a bit-map of queues to service at least once prior to servicing a first queue again.

EC88) The method of EC62, EC63, EC64, or EC65, wherein the auxiliary information specifies or changes an interval between or threshold for response notifications (EPWs) to a host for an associated response queue.

EC89) The method of EC62, EC63, EC64, or EC65, wherein the auxiliary information comprises information grouping at least two task requests to be processed in a predefined manner.

Computer Readable Medium

EC90) A computer readable medium having a set of instructions stored therein
that when executed by a processing element cause the processing element to
perform operations comprising:
reading a single enhanced pointer word stored in a memory location or register; and
parsing the enhanced pointer word to obtain a first portion having queue pointer indicator information and a second portion having auxiliary information.

EC91) A computer readable medium having a set of instructions stored therein that when executed by a processing element cause the processing element to perform operations comprising:
reading a single enhanced queue entry from a queue; and
parse the single enhanced queue entry to obtain a first portion having task
information and a second portion having auxiliary information.

EC92) A computer readable medium having a set of instructions stored therein that when executed by a processing element cause the processing element to perform operations comprising:
generating an enhanced pointer word having a first portion containing pointer information; and
writing the enhanced pointer word to a register or location in memory.

EC93) A computer readable medium having a set of instructions stored therein that when executed by a processing element cause the processing element to perform operations comprising:
generating an enhanced queue entry having a first portion containing task information and a second portion containing auxiliary information; and writing the enhanced queue entry to a single location of a queue.

EC94) The computer readable medium of EC90, EC91, EC92, or EC93, wherein the auxiliary information comprises indicator information for at least one other queue pointer.

EC95) The computer readable medium of EC90, EC91, EC92, or EC93, wherein the auxiliary information comprises priority information indicating a priority for at least one of a plurality of task requests or task request queues.

EC96) The computer readable medium of EC90, EC91, EC92, or EC93, wherein the auxiliary information indicates that a requested task is to be aborted.

EC97) The computer readable medium of EC90, EC91, EC92, or EC93, wherein the auxiliary information indicates that a plurality of task requests are to be performed atomically.

EC98) The computer readable medium of EC90, EC91, EC92, or EC93, wherein the auxiliary information indicates that a task is asynchronous and is to be performed after an isochronous request.

EC99) The computer readable medium of EC90, EC91, EC92, or EC93, wherein the auxiliary information comprises an arbitration weight for one or more queues.

EC100) The computer readable medium of EC90, EC91, EC92, or EC93, wherein the auxiliary information includes credit information associated with at least one queue of a plurality of queues to control processing of tasks from the plurality of queues.

EC101) The computer readable medium of EC90, EC91, EC92, or EC93, wherein the auxiliary information comprises a queue full or queue nearly full message.

EC102) The computer readable medium of EC90, EC91, EC92, or EC93, wherein the auxiliary information comprises an indicator of an updated pointer available in a predefined memory location.

EC103) The computer readable medium of EC90, EC91, EC92, or EC93, wherein the auxiliary information alters an arbitration method among a plurality of queues.

EC104) The computer readable medium of EC90, EC91, EC92, or EC93, wherein the auxiliary information specifies that information associated with a task should be encrypted.

EC105) The computer readable medium of EC90, EC91, EC92, or EC93, wherein the auxiliary information selects an encryption method.

EC106) The computer readable medium of EC90, EC91, EC92, or EC93, wherein the auxiliary information specifies a data transfer format.

EC107) The computer readable medium of EC90, EC91, EC92, or EC93, wherein the auxiliary information specifies at least in part die manner in which a task should be performed.

EC108) The computer readable medium of EC90, EC91, EC92, or EC93, wherein the auxiliary information indicates that one of a plurality of queues should be service next or should be skipped on its next selection.

EC109) The computer readable medium of EC90, EC91, EC92, or EC93, wherein the auxiliary information defines a frequency of servicing for a plurality of queues.

EC110) The computer readable medium of EC90, EC91, EC92, or EC93, wherein the auxiliary information specifies an interval for pointer updates.

EC111) The computer readable medium of EC90, EC91, EC92, or EC93, wherein the auxiliary information specifies that a specified number of interrupts are to be aggregated.

EC112) The computer readable medium of EC90, EC91, EC92, or EC93, wherein the auxiliary information comprises a phase bit to indicate that one or more entries have been added to a request queue.

EC113) The computer readable medium of EC90, EC91, EC92, or EC93, wherein the auxiliary information indicates an association between two or more queue entries.

EC114) The computer readable medium of EC90, EC91, EC92, or EC93, wherein the auxiliary information indicates a service group for a queue, either above or below the service group it was previously in.

EC115) The computer readable medium of EC90, EC91, EC92, or EC93, wherein the auxiliary information comprises a bit-map of queues to service at least once prior to servicing a first queue again.

EC116) The computer readable medium of EC90, EC91, EC92, or EC93, wherein the auxiliary information specifies or changes an interval between or threshold for response notifications (EPWs) to a host for an associated response queue.

EC117) The computer readable medium of EC90, EC91, EC92, or EC93, wherein the auxiliary information comprises information grouping at least two task requests to be processed in a predefined manner.

System

EC118) A system comprising:
a host bus adapter;
an I/O device controller;
wherein the host bus adapter is enabled to communicate task requests to the I/O device controller via at least one request queue of a paired queue and the controller is adapted to communicate task status via a response queue of the paired queue; and
wherein the host is enabled to write an enhanced queue entry to the request queue.

EC119) A system comprising:
a host bus adapter;
an I/O device controller;
wherein the host bus adapter is enabled to communicate task requests to the controller via at least one request queue of a paired queue and the controller is adapted to communicate task status via a response queue of the paired queue; and
wherein the host bus adapter is enabled to write an enhanced pointer word to a memory location or register.

EC120) A system comprising:
a host bus adapter;
an I/O device controller;
wherein the host bus adapter is enabled to communicate task requests to the I/O device controller via at least one request queue of a paired queue and the I/O device controller is adapted to communicate task status via a response queue of the paired queue;
wherein the I/O device controller is enabled to read an enhanced queue entry from the queue and to parse the enhanced queue entry to obtain a first portion having task information and a second portion having auxiliary information.

EC121) A system comprising:
a host bus adapter;
an I/O device controller;
wherein the host bus adapter is enabled to communicate task requests to the I/O device controller via at least one request queue of a paired queue and the I/O device controller is adapted to communicate task status via a response queue of the paired queue;
wherein the I/O device controller is enabled to read an enhanced pointer word from a memory location or register and to parse the enhanced pointer word to obtain a first portion having pointer information and a second portion having auxiliary information.

SSD Controller

FIG. 1A illustrates selected details of an embodiment of SSD 101 including an SSD controller operatively coupled with a host (such as a computing host), the host and controller configurable to employ enhanced queue management. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, a plurality of Flash Die 194 in the particular Flash Device 192 are optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a pre-mapped read command specifying a location in NVM 199 and a length and/or a span of data in read unit quanta. For yet another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary dc-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments. Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured to have one or more bands for storing data of different types and/or properties. A number, arrangement, size, and type of the bands is dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
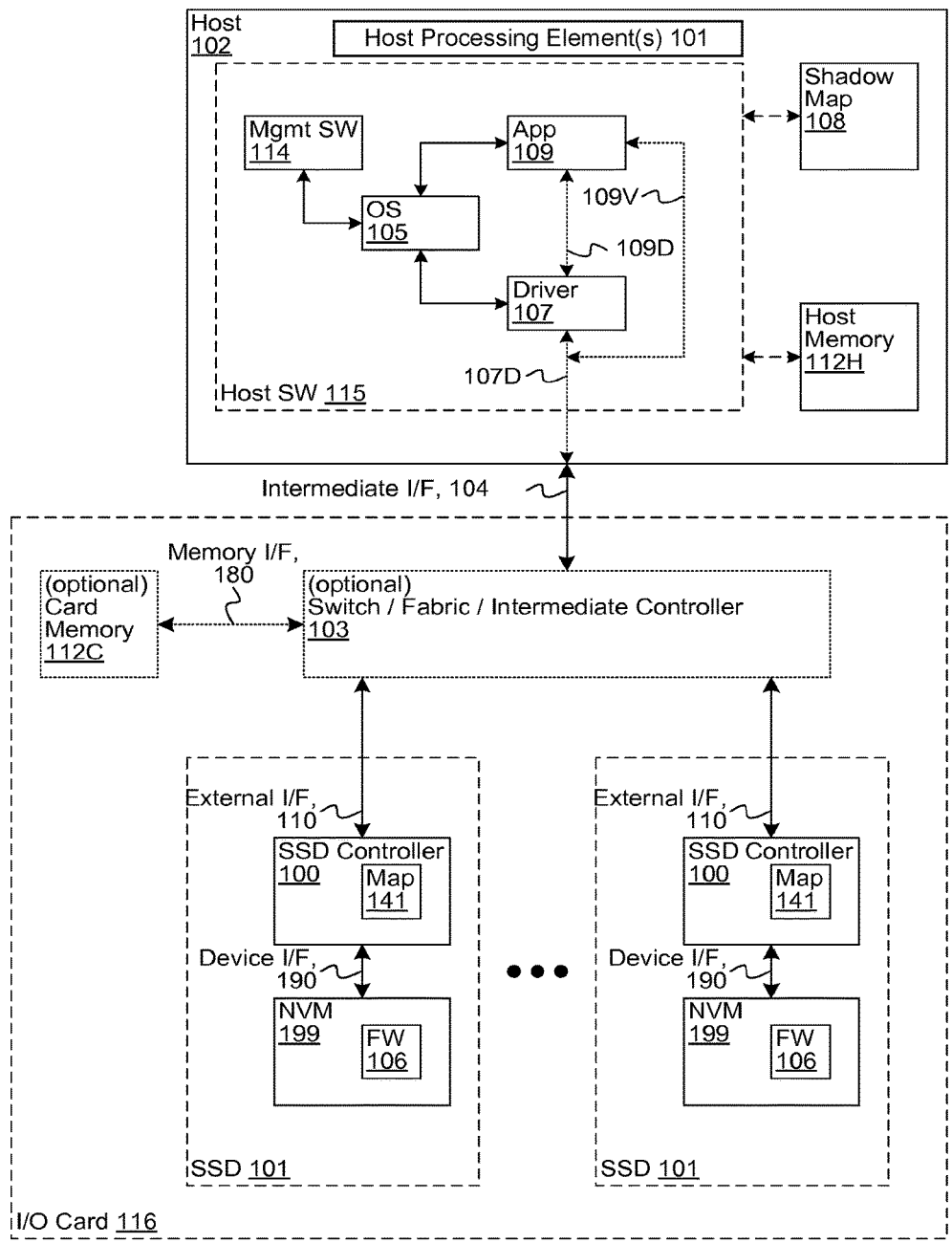
FIG. 1B illustrates, via block diagram, selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The one or more images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments. Host 102 includes Shadow Map 108 as a distinct hardware resource, while in other embodiments, a shadow map is implemented partially or entirely via Host Memory 112H. Examples of Shadow Map 108, the Host Memory 112H, and Card Memory 112C are one or more volatile and/or NVM elements, such as implemented via DRAM, SRAM, and/or flash devices. Further examples of the host memory are system memory, host main memory, host cache memory, host-accessible memory, and I/O device-accessible memory.

As is described in more detail elsewhere herein, in various embodiments Host 102 and/or one or more of the instances of SSD 101 are enabled to access Shadow Map 108 to save and retrieve all or any portions of mapping information usable to convert LBAs to block and/or page addresses targeting one or more portions of I/O device NVM, such as elements of one or more of the instances of NVM 199. Conceptually the Shadow Map follows (e.g. shadows) information in one or more of the instances of Map 141. Information in the Shadow Map is updated via one or more of Host 102 (e.g. in conjunction with issuing a command to an SSD) and one or more of the instances of SSD 101 (e.g. in conjunction with processing a command from a host). In some embodiments and/or usage scenarios (such as some embodiments having I/O Card 116 and using (optional) Card Memory 112C of FIG. 1B as storage for a shadow map), one or more I/O devices, e.g. SSDs, access the shadow map and a host does not. As is also described in more detail elsewhere herein, in various embodiments, one or more of the instances of SSD 101 are enabled to access Card Memory 112C and/or Host Memory 112H to save and restore state information internal to the respective SSD instance, such as when entering and exiting a sleep state.

In some embodiments lacking the Switch/Fabric/Intermediate Controller, the SSD is coupled to the host directly via External Interfaces 110. In various embodiments, SSD Controller 100 is coupled to the host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Host SSD Communication

Disclosed are paired-queue embodiments having improved communication efficiency and increased management flexibility. Queues can be implemented in hardware, software, or a combination thereof. While some paired queue embodiments are described relative to data storage systems, and employ the term host to refer to a requester of services and controller to refer to a provider of services, various embodiments are not limited to any particular area of applicability or any specific architecture of host or controller.

Figure 2:
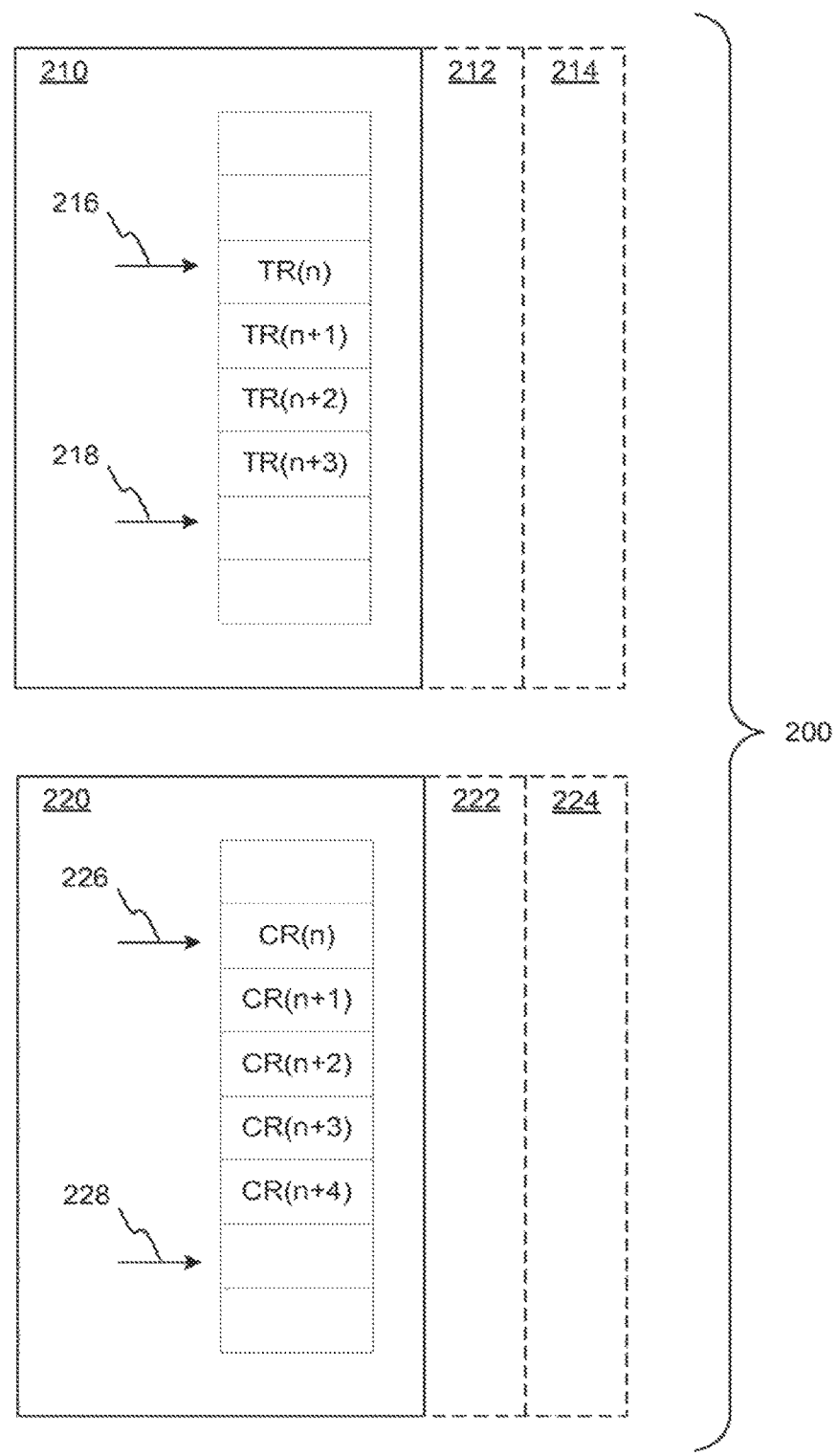
FIG. 2 illustrates selected details of an exemplary embodiment of a paired queue system.

FIG. 2 illustrates selected details of an exemplary embodiment of paired queues. Paired queues 200 comprise at least one request queue 210 and at least one response queue 220. Request queue 210 comprises a plurality of storage locations indexed by head pointer 216 and tail pointer 218. Response queue 220 (a.k.a. a completion queue) comprises a plurality of storage locations indexed by head pointer 226 and tail pointer 228. Some embodiments comprise one request queue and one completion queue. Some other embodiments comprise a plurality of request queues, as illustrated by queues 210, 212, 214 with one response queue. Some other yet embodiments comprise a plurality of both request queues 210, 212, 214 and response queues as illustrated by queues 220, 222, 224. Embodiments are not limited to any particular number of request queues or response queues. In some embodiments, information contained in a request specifies a response queue to which a response is to be sent. Request and response queues need not be of the same data width or number of entries. In some embodiments queue pointer information is conveyed between a host and a controller employing an enhanced pointer word (EPW) that comprises pointer indicator information and optional auxiliary information. For example, see EPW 230, one of several EPW formats illustrated in FIG. 4, discussed infra. Pointer indicator information can be of any format and employed in any manner to modify or maintain the value of a pointer, including but not limited to: a literal pointer value, a command to increment or decrement a pointer, a value to be added to or subtracted from a previous pointer value, or a reference to a register or memory location containing an updated pointer value, or a value used to modify a previous pointer. Auxiliary information can be of any format and purpose.

In operation, a host, such as Host 102 of FIG. 1B, for example, writes a task request to request queue 210 at die location identified by tail pointer 218, after which tail pointer 218 is advanced to a next location, unless the queue is full. A controller, such as SSD Controller 100 in FIG. 1A, for example, retrieves an (a request) entry from request queue 210 at the location identified by head pointer 216, after which head pointer 216 is advanced to a next location, unless the queue is empty. After a task is processed by controller 100, a response to the task is written to response queue 220 at tail location 228 after which tail pointer 228 is advanced to a next location unless the queue is full. Host 102 retrieves task status or other information from response queue 220 at a location identified by head pointer 226, alter which head pointer 226 is advanced to a next location.

Head and Tail Position Updates

Queue head and tail location changes must be communicated between the host and controller to indicate entries have been appended to the queue tail, or entries have been consumed from the queue head. In some embodiments, after one or more pointer values are changed, one or more EPWs are conveyed to communicate changes between host 102 and controller 100. This can comprise writing an EPW to a register or memory location that is readable by the controller or host, signaling the controller or host to read an EPW from a previously identified memory location or register, or any other method of information conveyance. In some embodiments, different memory locations are used for each pointer, each pointer type, and/or each queue.

In some embodiments, the request queue tail is advanced to indicate entries have been appended by the host writing to a location monitored by the controller. For example, a PCIe host interface exposes a memory window where the host writes tail position updates for a plurality of individual request queues.

In some embodiments, the controller reports the advance of the request queue head by writing the updated head position in a negotiated location in host memory. For example, at the time the request queue is created, the host passes the location where the head position updates should be written in host memory by the controller.

In other embodiments, the controller reports the position of the completion queue tail by writing the updated tail position in a negotiated location in host memory. For example, at the time the completion queue is created, the host passes the location where the tail position update should be written in host memory by the controller.

In some embodiments, the completion queue head is advanced to indicate entries have been processed by the host writing to a location monitored by the controller. For example, a PCIe host interface exposes a memory window where the host writes head position updates for a plurality of individual completion queues.

Location of Queues

Queues can be implemented anywhere in a system that provides a host write access to one or more request queues plus read access to one or more response queues, and provides controller read access to one or more request queues and write access to one or more response queues.

In some embodiments, a particular queue (request or completion) is allocated in host memory. The queue does not have to reside in a physically contiguous region in host memory. For example, a 64K queue in host memory can be broken up into four 16K sections.

In some embodiments a particular queue (request or completion) can reside in memory that is not local to the host. For example, a controller contains memory where the queue(s) reside. In other embodiments, the memory where the queues reside is external to the controller.

In some embodiments, one or more request queues are implemented in controller memory and one or more response queues are implemented in host memory. In some embodiments request and response queues are implemented in controller memory.

Enhanced Pointer Words

As described previously, queue pointer information is conveyed in an enhanced pointer word (EPW) comprising a pointer value indicator and optional auxiliary information. Typically the number of entries within a queue can be represented by significantly fewer bits than is provided by the native data width of the system. For example, in a 32 bit system, queues with 64K locations need only 16 bits to uniquely identify any one location, leaving 16 bits for other auxiliary information in a single 32 bit EPW. For some 32 bit systems, queues with much less than 64K entries are appropriate. In some embodiments EPWs provided by a host employ a first format and EPWs provided by a controller employ a second format. In some embodiments, the format for request queue EPWs is different than that for response queue EPWs. In some embodiments, auxiliary information is provided in a separate operation that is associated with the pointer update.

Figure 4:
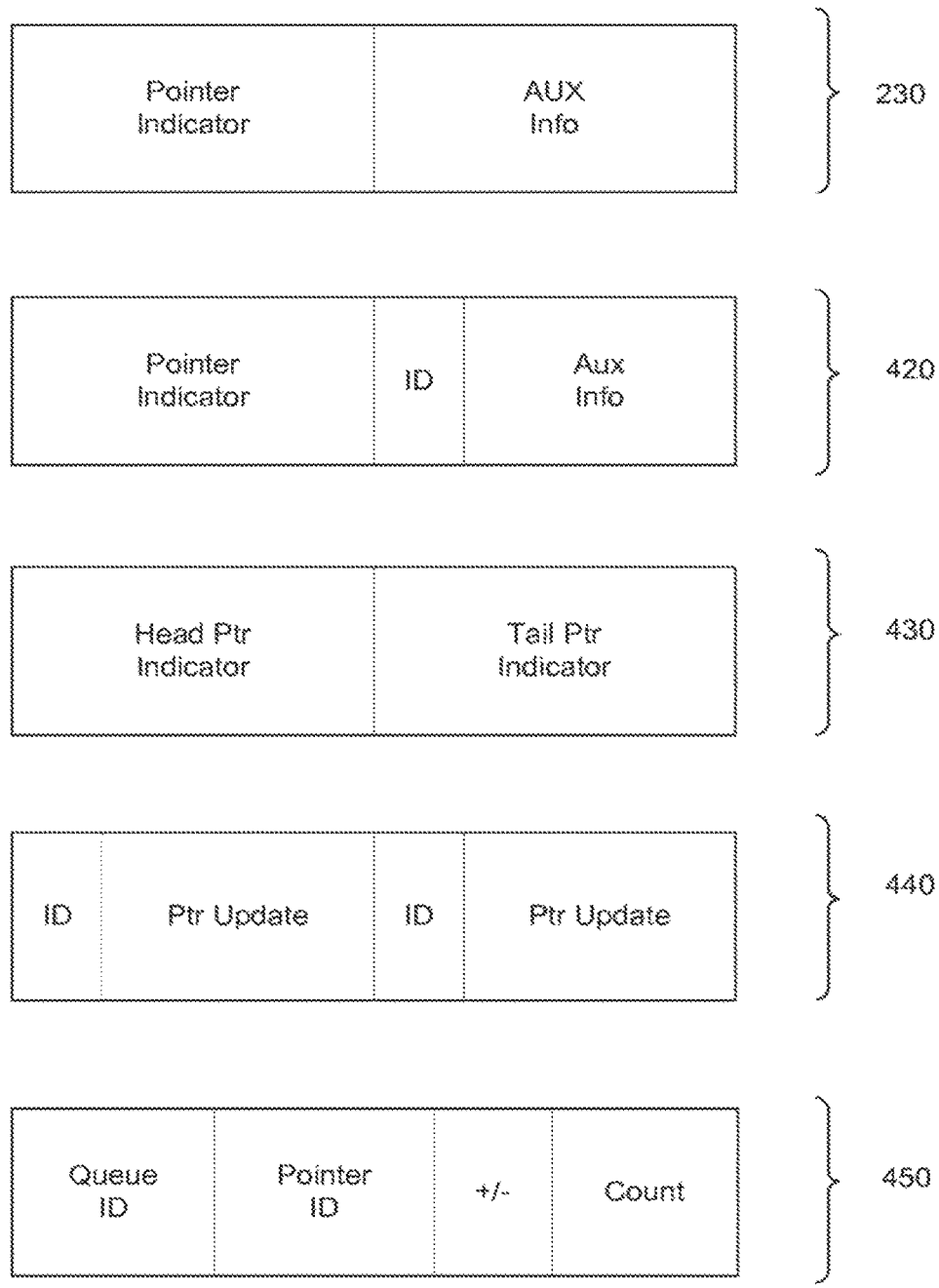
FIG. 4 illustrates selected details of exemplary embodiments of an enhanced pointer word format.

FIG. 4 illustrates selected details of exemplary embodiments of enhanced pointer word formats. EPW 230 comprises a pointer indicator and optional auxiliary information. EPW 420 depicts an exemplary format comprising a pointer indicator, a pointer ID, and auxiliary information. EPW 430 depicts an exemplary two pointer format as can be employed to convey an updated request queue tail pointer value and an updated response queue head value to a controller; or to convey an updated request queue head pointer and an updated response queue tail pointer to a host. EPW 440 comprises pointer indicators and pointer IDs as can be used in multiple request and/or response queue implementations. EPW 450 illustrates an exemplary format used to increment or decrement a pointer by a specified count in a multiple queue system. Various embodiments are not limited to any particular EPW format.

Advantageously, auxiliary information provides an opportunity for increased system control without consuming additional system bandwidth. In some embodiments, auxiliary information is employed to signal a controller to abort a pending or executing task. For example, a data storage controller processing requests providing pre-fetch of streaming media data receives auxiliary information signaling an abort of a retrieval task if a user cancels playing of the media.

In some embodiments, auxiliary information supplied with a pointer update is employed to alter the arbitration policy for a queue wherein the priority of a queue is raised or lowered with respect to other queues. For example, in a scheme where weighted round robin is employed to select the next queue to process, auxiliary information in some embodiments changes the priority of a queue in the weighted round robin scheme. In an arrangement that employs round robin scheduling with strict priorities, where all the queues at a given priority are serviced in a round robin fashion, some embodiments employ auxiliary information to move a queue into a different service group, either above or below the service group it was previously in.

In some embodiments, auxiliary information is used to affect the arbitration among queues and instead of arbitrating in strict round robin fashion, auxiliary information identifies a queue to be serviced next, or not serviced next (skipped). In other embodiments, auxiliary information provides a bit-map of queues to service at least once prior to servicing this queue again. Round robin arbitration does not imply that there is not an additional priority scheme being employed for arbitration. In some embodiments, auxiliary information changes the frequency of queue servicing. For example, a host requiring isochronous operation employs auxiliary information to adjust the service interval of a particular queue based on a desired data rate for that queue. In some embodiments auxiliary information is employed to specify or change an interval between response notifications (EPWs) to a host for an associated response queue.

In some embodiments, auxiliary information associatively groups a series of operations. For example, a host adds 4 entries to the tail of a request queue then provides auxiliary information to a controller within a tail pointer EPW to indicate that the 4 entries represent a "super" or "fused" group of entries representing one command, or a series of commands that are to be performed atomically, or in some specific order.

In various embodiments, auxiliary information of an EPW provides queue credit information as part of a credit based method for managing queue servicing, offering more direct and dynamic control over which queues are serviced. In some embodiments, the host provides a token-bucket-like credit count (in a fixed size unit) for each queue, and only queues with a positive count are serviced, and credits are replenished through auxiliary information contained in EPWs. If no queue has credits, the arbitration method reverts to a round-robin or other arbitration method. In some embodiments, credits provided by the host for one queue of a plurality of queues provides the one queue higher priority in the arbitration scheme until credits are exhausted.

In some embodiments, an EPW provided by a controller to update a request queue head pointer comprises auxiliary information indicating the remaining controller credits for that request queue. For example, as host supplied credits are consumed for a request queue, the controller provides updates to the credit value along with updates to the request queue head position in an EPW. In some embodiments auxiliary information indicates the availability of information, such as credits or other information in a negotiated location in host or controller memory.

In some embodiments, auxiliary information supplied with a response queue head update from the host is employed to affect interrupt aggregation for that completion queue. For example, a host initially sets parameters that supply a time interval and threshold that define when a controller notifies the host to service a response queue, wherein the host can change the time and/or threshold value through auxiliary information supplied with a response queue head EPW update.

In some embodiments, auxiliary information is employed to change priority of one or more requests stored in one or more queues. For example, if a request from one queue results in a long execution time for a corresponding task, other request queues can be given higher priority for a period of time or number of requests in order to provide a desired bandwidth distribution among requests.

Enhanced Queue Entries

Figure 3:
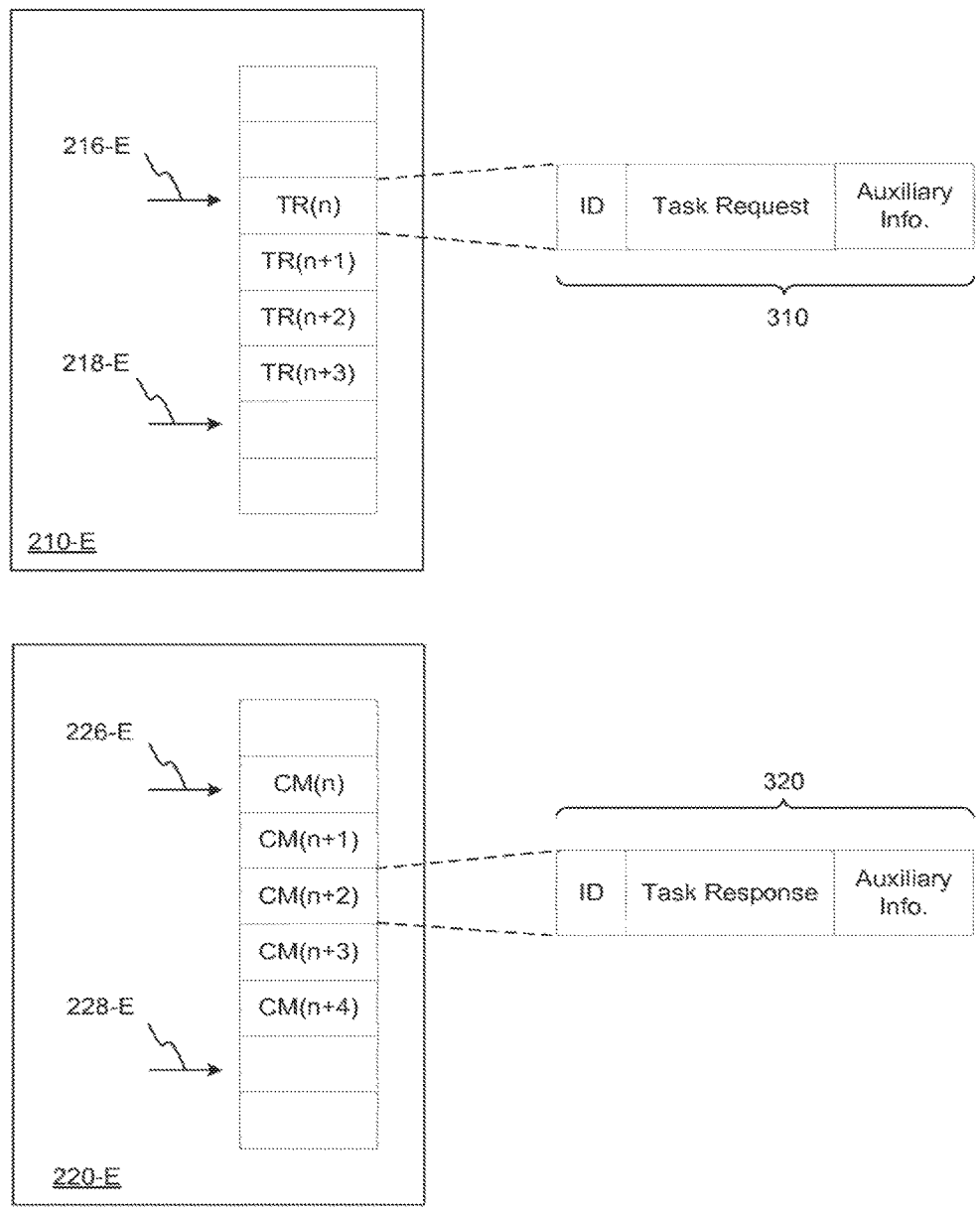
FIG. 3 illustrates selected details of exemplary embodiment of request queue entries and response queue entries.

In some embodiments, queue pointer indicator information or other auxiliary information is contained or "piggy-backed" in a request or response queue entry, resulting in an enhanced queue entry. FIG. 3 illustrates selected details of exemplary embodiments of enhanced request queue entries (ERQs) and enhanced response queue entries (ERPs). In some embodiments ERQ 310 comprises a task ID, task information, and optional auxiliary information. In some embodiments ERP 320 comprises a task ID, task completion information, and optional auxiliary information. For example, in addition to the information required in a response queue entry to report the results of a request, the completion queue entry in some embodiments also has fields containing a request queue ID and head pointer value employed to update the head pointer for the request queue bearing that ID. In some embodiments one ERP serves as a response for a plurality of ERQs.

In some embodiments, a host and/or controller receiving enhanced queue entries parse auxiliary information as the entries are received. In some embodiments, a controller updates the position of a response queue tail by changing the state or polarity of a phase bit in an enhanced response queue entry. For example, a circular queue begins initially with all phase bits having the same initial polarity and, as the controller adds entries to the tail of the queue, the controller changes the polarity of the phase bit to indicate that entry has been added to the tail of the queue. In some embodiments, auxiliary information contained in EPWs or contained in additional queue entry fields can be combined with auxiliary information contained in other EPWs or other enhanced queue entries to provide a system control function.

Enhanced Queue Pointer Operation

Figure 5:
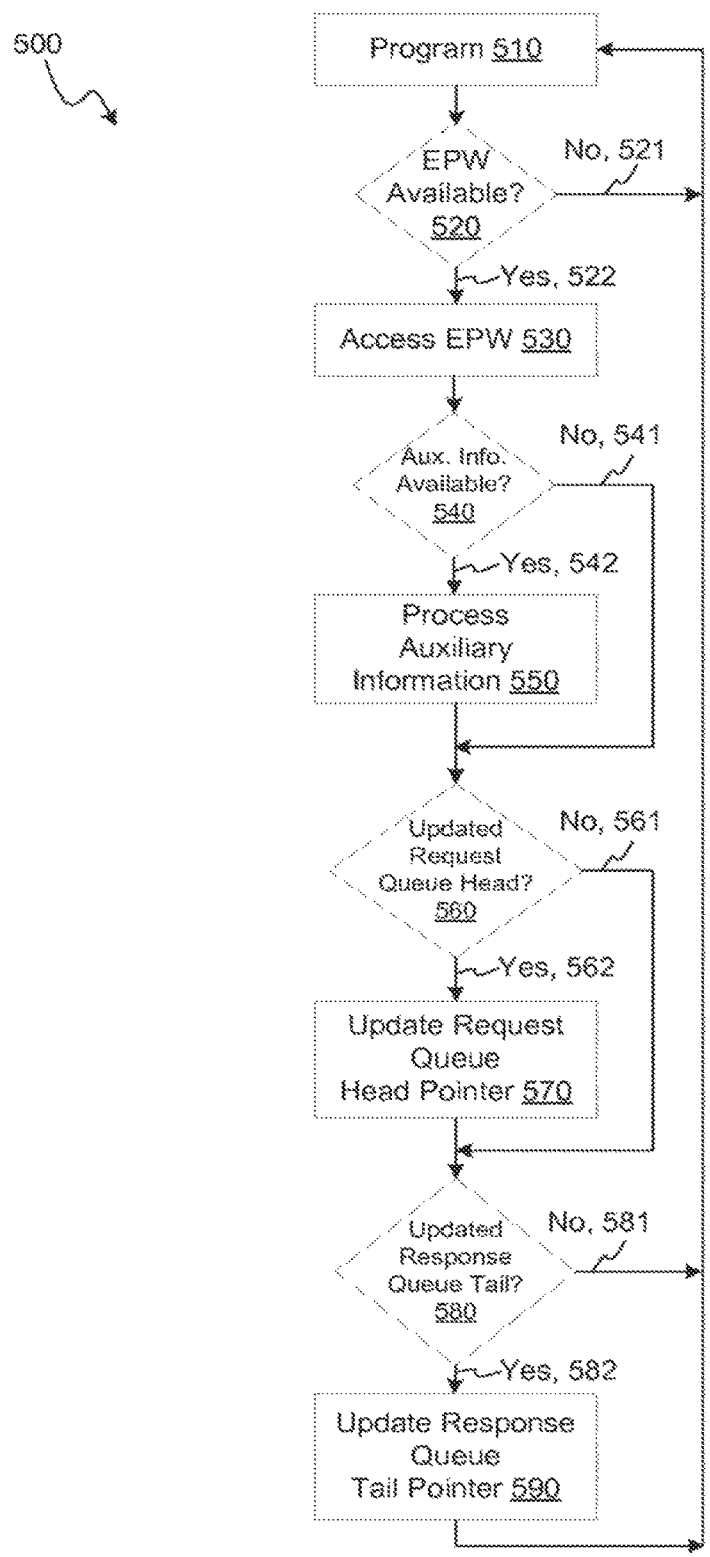
FIG. 5 illustrates, via flowchart, selected details of an exemplary embodiment of a procedure for host updating of queue pointers.

FIG. 5 illustrates, via flowchart, selected details of an exemplary embodiment of a procedure for host updating of queue pointers. Procedure 500 can be performed by a host CPU, I/O processor, or any other processing element 101, or by a combination thereof. Portions of the described method can be performed by different processing elements. Procedure 500 is initiated by program 510. Program 510 can be part of a device driver, operating system, or any other code that processes pointer updates. A determination is made (520) if an EPW is available to the host. If no EPW is available (521), processing continues at program 510. If an EPW is available (522), the EPW is accessed (530). A check is performed (540) to determine if auxiliary information is available from the EPW. If no auxiliary information is available (541), processing continues at operation 560. If auxiliary information is available (542), the information is processed (550) and processing continues at operation 560. At operation 560, a determination is made if the EPW contains request queue head pointer information. If the EPW does not contain head pointer information (561), processing continues at operation 580. If the EPW contains request queue head pointer information (562), a request queue head pointer value is updated (570) and processing continues at operation 580. At operation 580 a determination is made if the EPW contains response queue tail information. If the EPW does not contain response queue tail information (581), processing continues at program 510. If the EPW contains response queue tail information (582), a response queue tail pointer value is updated (590) and processing continues at program 510. Various modifications can be made to the method of FIG. 5 including but not limited to performing operations 540, 560 and 580 in an order different than that depicted.

Figure 6A:
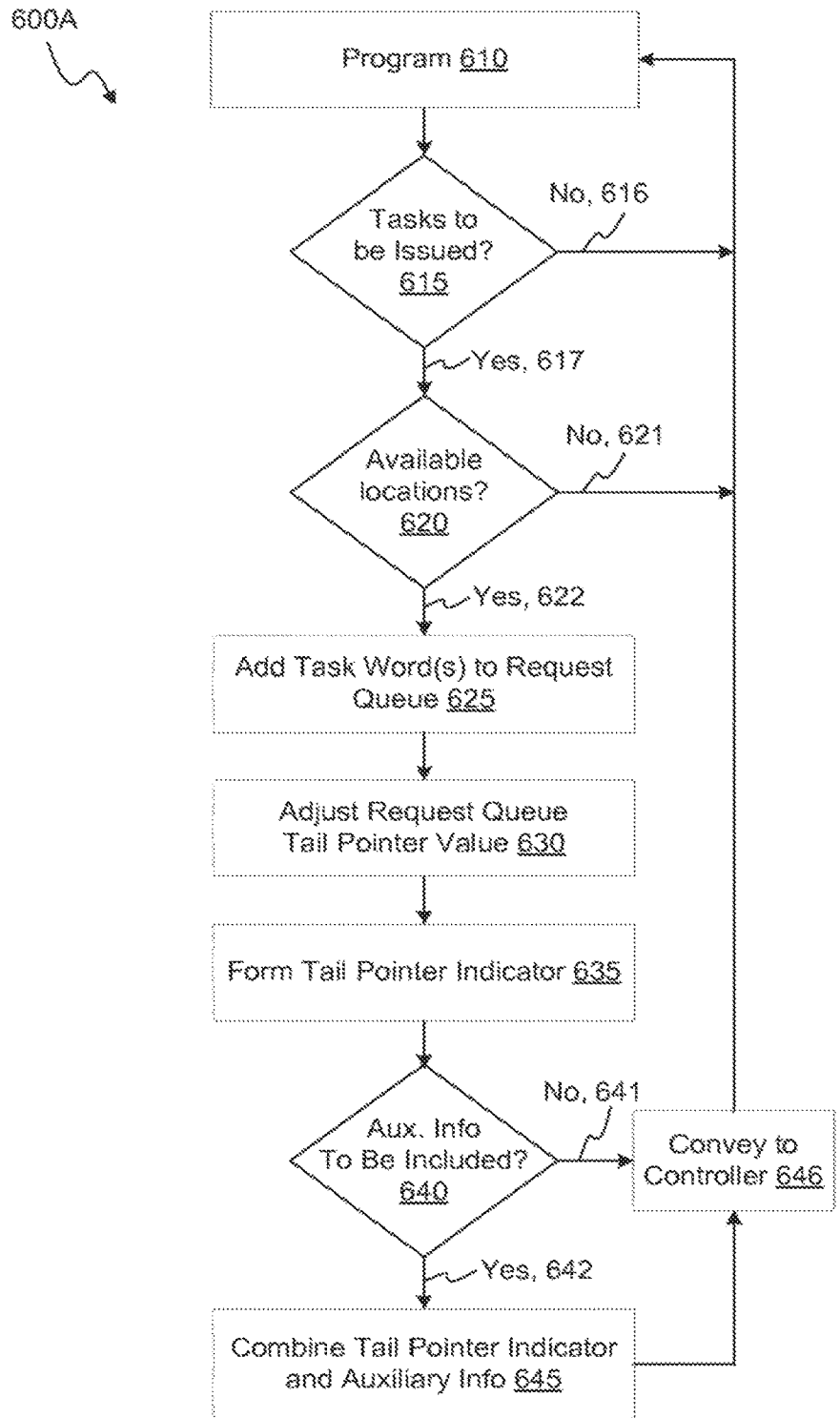
FIG. 6A illustrates, via flowchart, selected details of an exemplary embodiment of a procedure for host generation of enhanced pointer words (EPWs) responsive to issuing tasks.

FIG. 6A illustrates, via flowchart, selected details of an exemplary embodiment of a procedure for host generation of enhanced pointer words (EPWs) associated with issuing tasks. Program 610 is a portion of code operating in a host. A determination is made (615) if there are tasks to be issued to a controller. If no tasks are to be issued (616), processing continues at program 610. If a task is to be issued (617), a determination is made (620) if there are locations available in a request queue. If locations are not available (621) processing continues at program 610. If locations are available (622) one or more task words are written to the queue (625) and the request queue tail pointer updated (630). A tail pointer indicator is formed (635) comprising an encoded version of the tail pointer value, the tail pointer value, or other representation of tail pointer information. A check is made (640) if there is auxiliary information to be included in the EPW. If no auxiliary information is to be included (641), the tail pointer indicator is conveyed (646) to a location accessible by a controller. If auxiliary information is to be included (642), tail pointer indicator and auxiliary information are combined (645) and conveyed (646) to the controller.

Figure 6B:
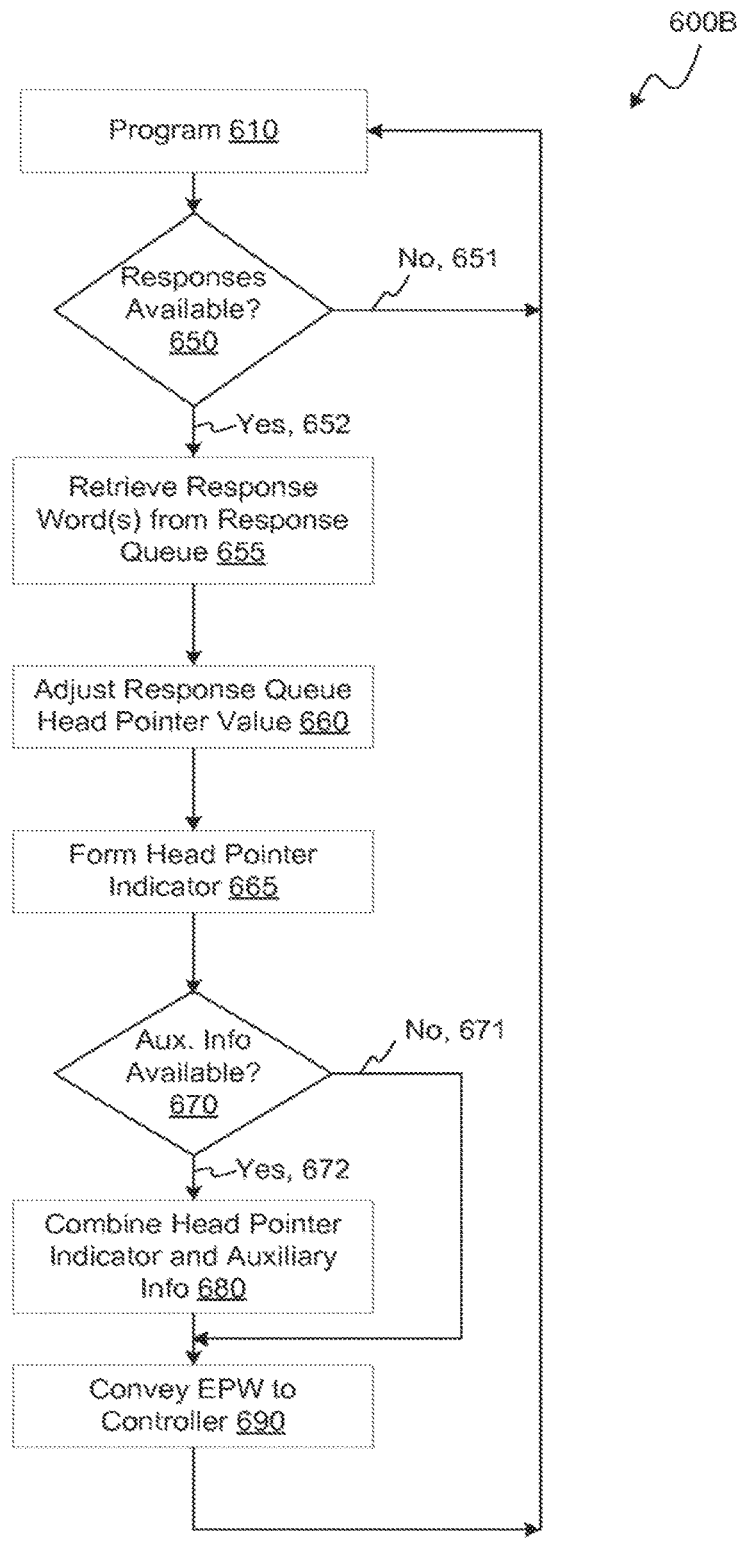
FIG. 6B illustrates, via flowchart, selected details of an exemplary embodiment of a procedure for host generation of enhanced pointer words (EPWs) responsive to processing controller responses.

FIG. 6B illustrates, via flowchart, selected details of an exemplary embodiment of a procedure for host generation of enhanced pointer words (EPWs) associated with processing controller responses. A determination is made (650) if response queue entries are available. If no entries are available (651) processing continues at 610. If entries are available (652), one or more response entries are retrieved (655). The head pointer value is adjusted to reflect the number of entries retrieved (660) and a head pointer indicator formed (665) comprising an encoded version of the head pointer value, the head pointer value, or other representation of head pointer information. A check is performed (670) to determine if auxiliary information is to be included in the EPW. If no auxiliary information is to be included (671) the EPW comprising a head pointer indicator is conveyed (690) to the controller. If auxiliary information is to be included (672), head pointer indicator and auxiliary information are combined (680) and conveyed (690) to the controller.

Procedures illustrated in FIGS. 6A and 6B may be performed serially or concurrently. In some embodiments, when no auxiliary information is to be included with a request queue tail pointer and no information is to be included with a response queue head pointer, the request queue tail pointer and the response queue head pointer information may be combined into a single EPW.

Figure 7:
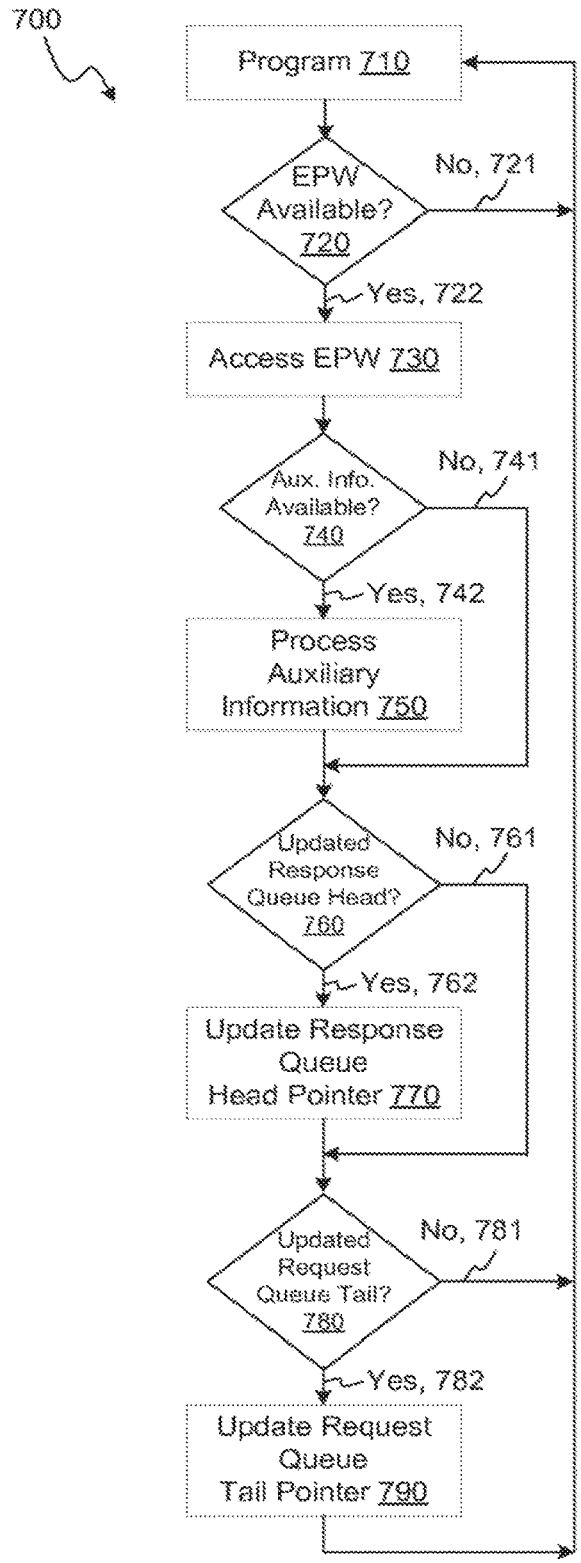
FIG. 7 illustrates, via flowchart, selected details of an exemplary embodiment of a procedure for host updating of queue pointers.

FIG. 7 illustrates, via flowchart, selected details of an exemplary embodiment of a procedure for host updating of queue pointers. Method 700 can be performed by a controller CPU or other processing element. Portions of the described method can be performed by different processing elements. Method 700 is initiated by program 710. A determination is made (720) if an EPW is available to the controller. If no EPW is available (721), processing continues at program 710. If an EPW is available (722), the EPW is accessed (730). Auxiliary information is parsed (740) from the EPW and the auxiliary information is processed (750). Processing can be skipped if the auxiliary field does not contain specific data or command information, or comprises information for a pointer. A determination is made (760) if the EPW contains response queue head pointer information. If the EPW does not contain head pointer information (761), processing continues at step 710. Alternatively, processing can continue at step 780. If the EPW contains response queue head pointer information (762), a response queue head pointer value is updated (770) and processing continues at step 710. Alternatively, processing can continue at step 580. A determination is made (780) if the EPW contains request queue tail information. If the EPW does not contain request queue tail information (781), processing continues at step 710. If the EPW contains request queue tail information (782), a request queue tail pointer value is updated (790) and processing continues at step 710. Various modifications can be made to the method of FIG. 7 including but not limited to performing step 780 before step 760, for example.

Figure 8A:
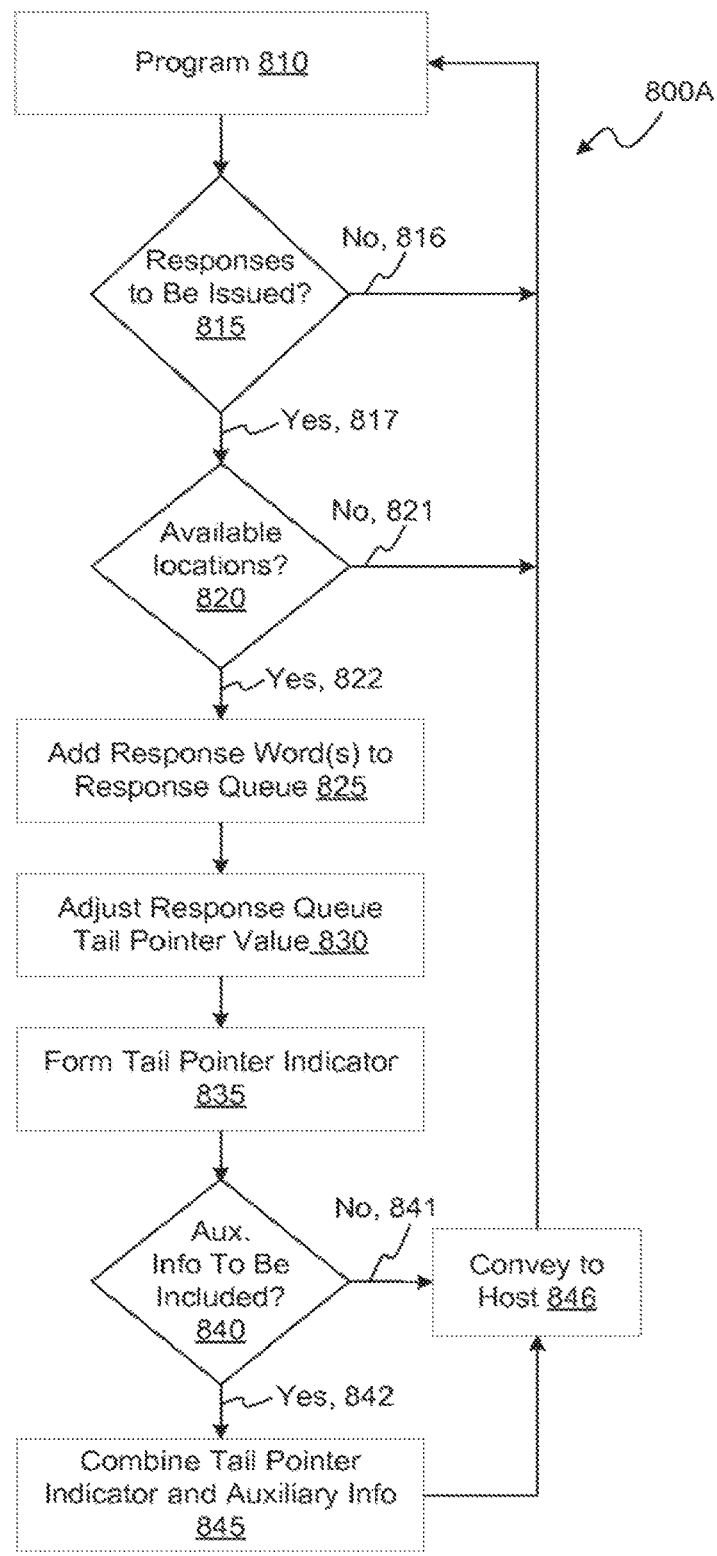
FIG. 8A illustrates, via flowchart, selected details of an exemplary embodiment of a procedure for controller generation of enhanced pointer words (EPWs) associated with controller issuing of responses.

FIG. 8A illustrates, via flowchart, selected details of an exemplary embodiment of a procedure for controller generation of enhanced pointer words (EPWs) associated with controller issuing of responses. Program 810 is a portion of code operating in a controller. A determination is made (815) if there are responses to be issued. If no responses are present (816) processing continues at 810. If a response is present (817), a determination is made (820) if there are locations available in a response queue. If locations are not available (821) processing continues at 810. If locations are available (822) one or more response words are written to the queue (825) and the response queue tail pointer updated (830). A tail pointer indicator is formed (835) comprising an encoded version of the tail pointer value, the tail pointer value, or other representation of tail pointer information. A check is made (840) if there is auxiliary information to be included in the EPW. If no auxiliary information is to be included (841) the EPW comprising a tail pointer indicator is conveyed (890) to the controller. If auxiliary information is to be included (842), tail pointer indicator and auxiliary information are combined (845) and conveyed (846) to the controller.

Figure 8B:
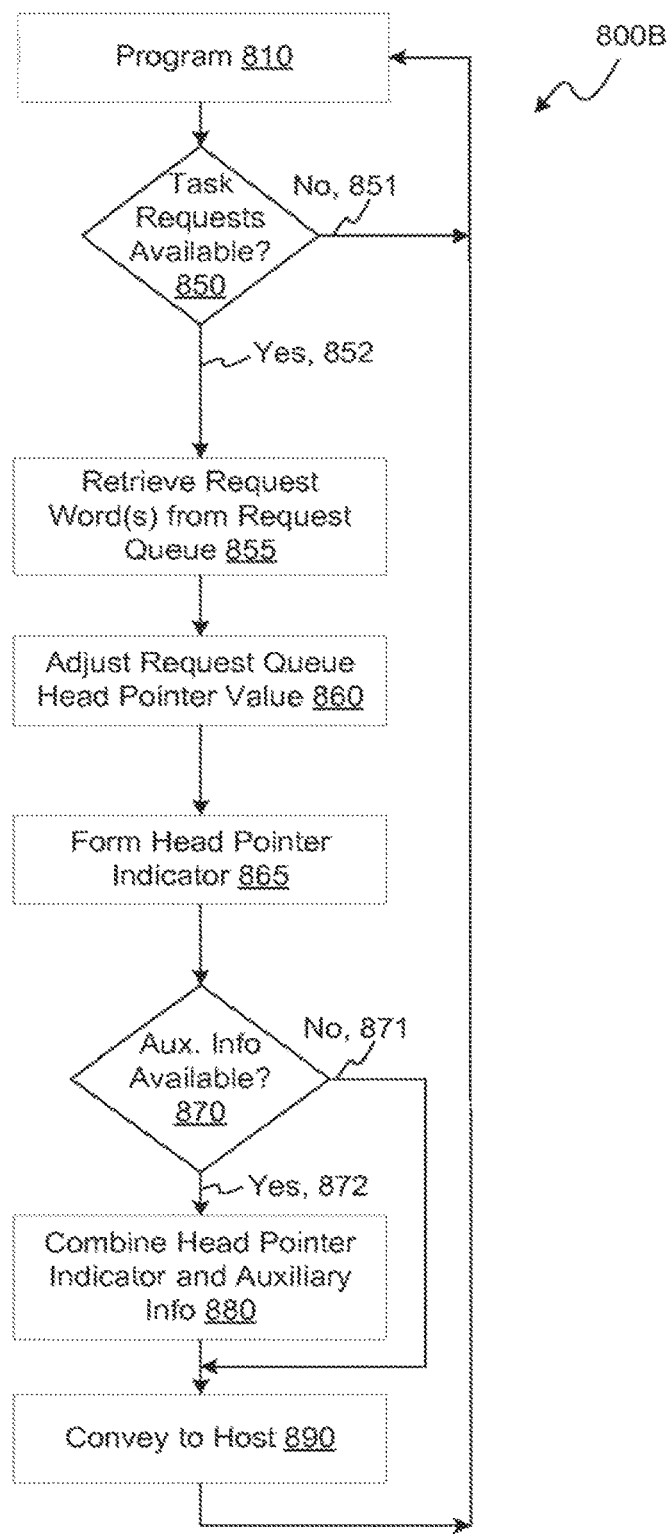
FIG. 8B illustrates, via flowchart, selected details of an exemplary embodiment of a procedure for controller generation of enhanced pointer words (EPWs) associated with controller processing of task requests.

FIG. 8B illustrates, via flowchart, selected details of an exemplary embodiment of a procedure for controller generation of enhanced pointer words (EPWs) associated with controller processing of task requests. A determination is made (850) if request queue entries are available. If no entries are available (851) processing continues at 810. If entries are available (852), one or more request entries are retrieved (855). The request queue head pointer value is adjusted to reflect the number of entries retrieved (860) and a head pointer indicator formed (865) comprising an encoded version of the head pointer value, the head pointer value, or other representation of head pointer information. A check is performed (870) to determine if auxiliary information is to be included in the EPW. If no auxiliary information is to be included (871) de EPW comprising a head pointer indicator is conveyed (890) to the controller. If auxiliary information is to be included (872), head pointer indicator and auxiliary information are combined (880) and conveyed (890) to the controller.

Figure 9:
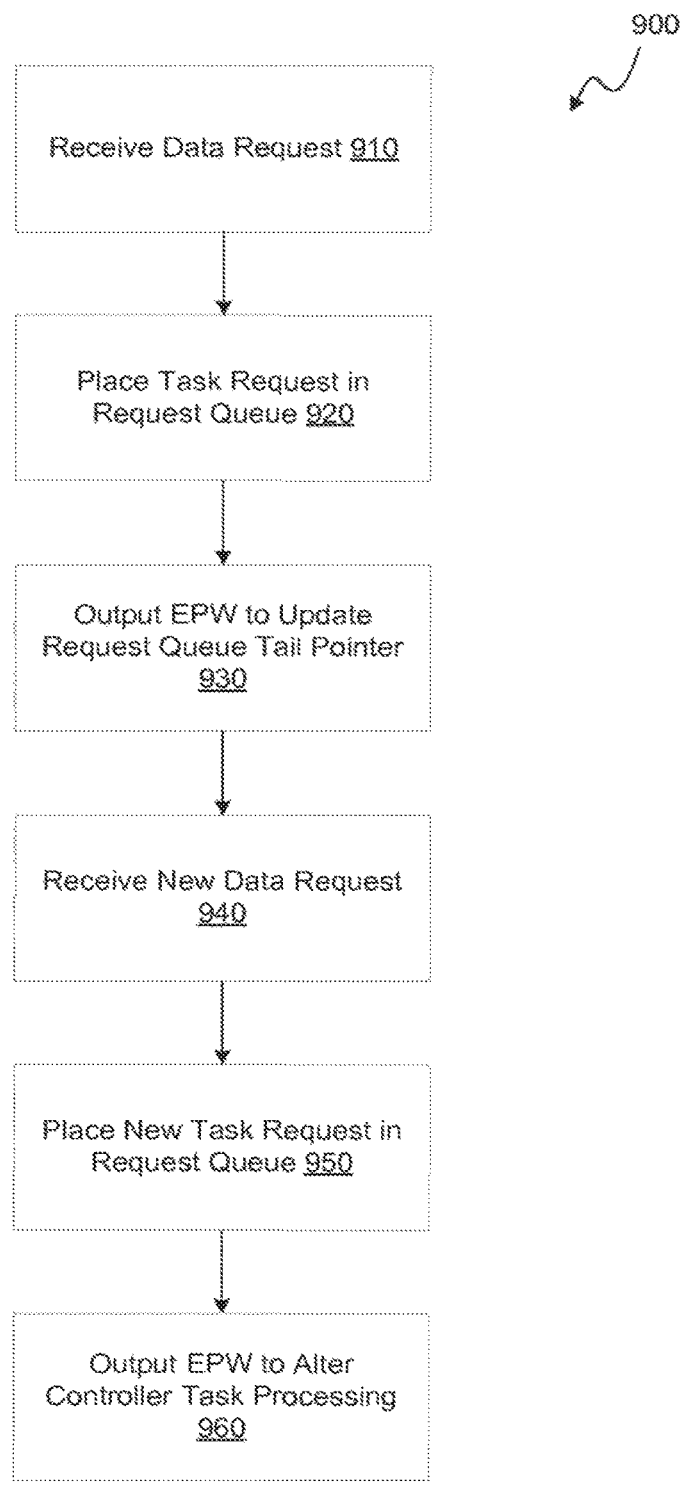
FIG. 9 illustrates, via flowchart, selected details of an exemplary embodiment of a procedure for host utilization of enhanced pointer words (EPWs).

FIG. 9 illustrates, via a flowchart, selected details of an exemplary embodiment of a procedure for host utilization of enhanced pointer words (EPWs). During operation, a host receives a data request (910) to store or retrieve one or more items of data. The host places a task request in a task queue (920) and issues an EPW (930) comprising request queue tail pointer information and optionally auxiliary information. At some point after operation 930, the host processes another data request (940) and places a corresponding task request in the task queue (950). The host issues an EPW (960) containing request queue tail pointer information and auxiliary information operable to be processed by a controller to alter the processing of one or more tasks. Such alteration can include, but is not limited to, alteration of priorities for pending tasks, and alteration of arbitration methods, for example. In some embodiments, if a host determines the request queue to contain more than a predetermined number of entries, issuing of EPWs is deferred unless it is desired to send auxiliary information to a controller. Placing a plurality of requests in a request queue prior to issuing an EPW reduces bandwidth consumed in queue management. In some embodiments, if a host determines the request queue contains more than a predetermined number of entries, the host locally buffers a plurality of task requests which later are transferred as a group to a request queue. This allows burst mode transfers, reducing queue operation bandwidth consumption.

Figure 10:
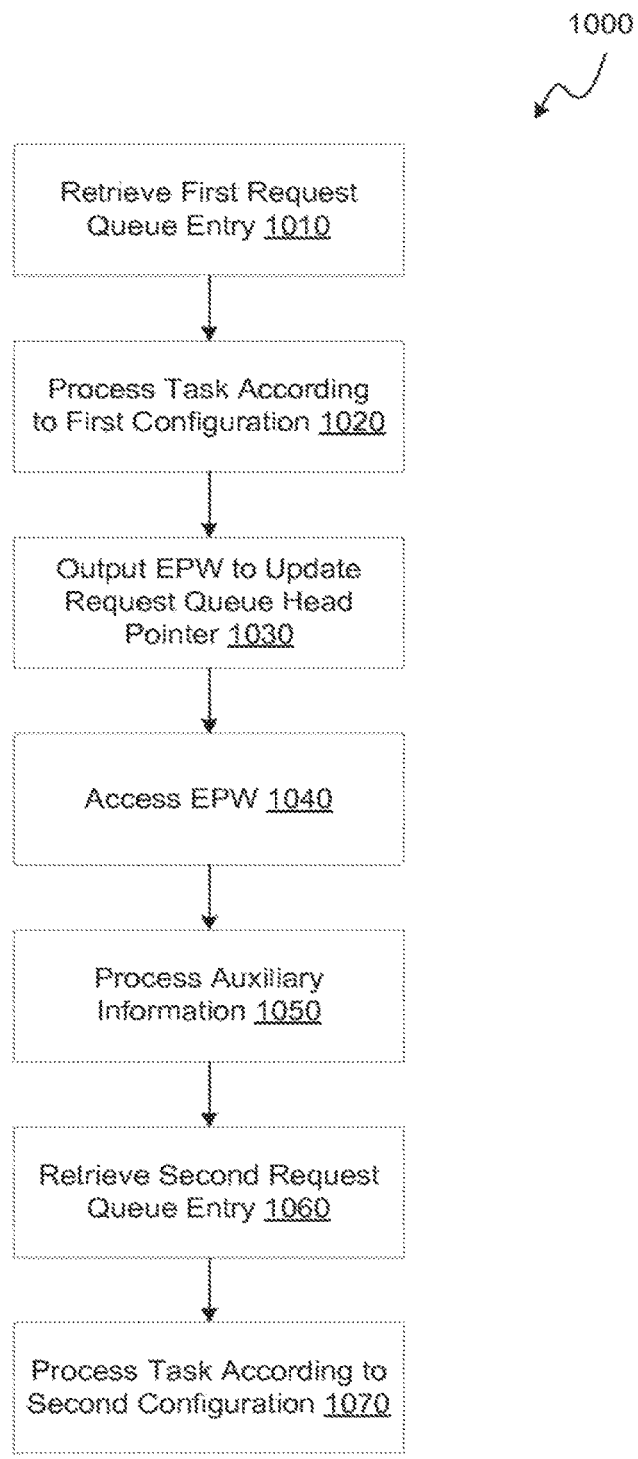
FIG. 10 illustrates, via flowchart, selected details of an exemplary embodiment of a procedure for controller utilization of enhanced pointer words (EPWs).

FIG. 10 illustrates, via flowchart, selected details of an exemplary embodiment of a procedure for controller utilization of enhanced pointer words (EPWs). During operation, the controller retrieves (1010) an entry from a request queue. A task contained in the entry is then processed (1020) according to a first controller configuration after which the controller optionally outputs (1030) an EPW to convey an updated request queue head pointer to a host. After processing the task associated with the retrieved entry, the controller accesses an EPW (1040) conveyed from a host and processes (1050) auxiliary information commanding a second controller configuration after which a second request queue entry is retrieved (1060) and is processed (1070) according to the second controller configuration.

Enhanced Queue Entry Utilization

Figure 11:
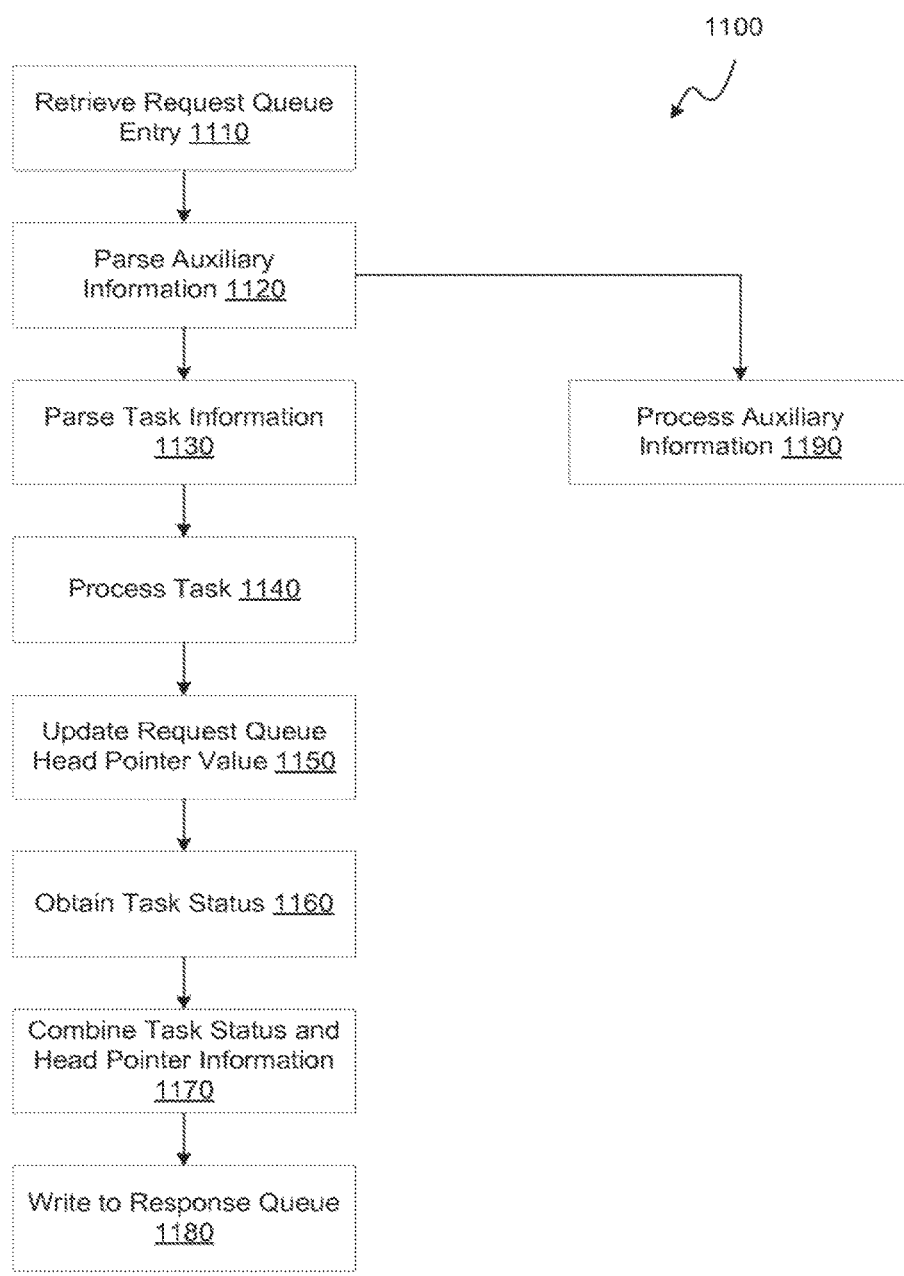
FIG. 11 illustrates, via flowchart, selected details of an exemplary embodiment of a procedure for controller utilization of enhanced queue entries.

FIG. 11 illustrates, via flowchart, selected details of an exemplary embodiment of a procedure for controller utilization of enhanced queue entries. During operation, the controller retrieves (1110) an enhanced request queue word (ERQ) from a request queue. Auxiliary information in the ERQ is parsed (1120) and processed (1190). Task information is also parsed (1130) from the ERQ and a task processed (1140) after which the request queue head pointer value is updated (1150). Status for the task processed is obtained (1160) and combined 1170) with request queue head pointer information to form an enhanced response queue word (ERP), which is then written (1110) to a response queue. Various embodiments may not perform all the operations shown in FIG. 11. For example, some embodiments receive an enhanced request word and process the task information and auxiliary information and write only task status to a response queue. Alternatively, some embodiments retrieve only a task request and write an enhanced response queue word comprising task status and auxiliary information. In some embodiments, a host writes one or more enhanced request queue words to an addressable location or locations within the controller, wherein the controller is adapted to parse auxiliary information from the enhanced request queue word or words and then write the task request information to a request queue disposed in the controller. FIG. 11 is not temporally limiting such that, in some embodiments, tasks can be performed in an order different than that depicted, or may be delayed, such as processing a plurality of task requests prior to writing task status information or an enhanced response word to a response queue.

Figure 12A:
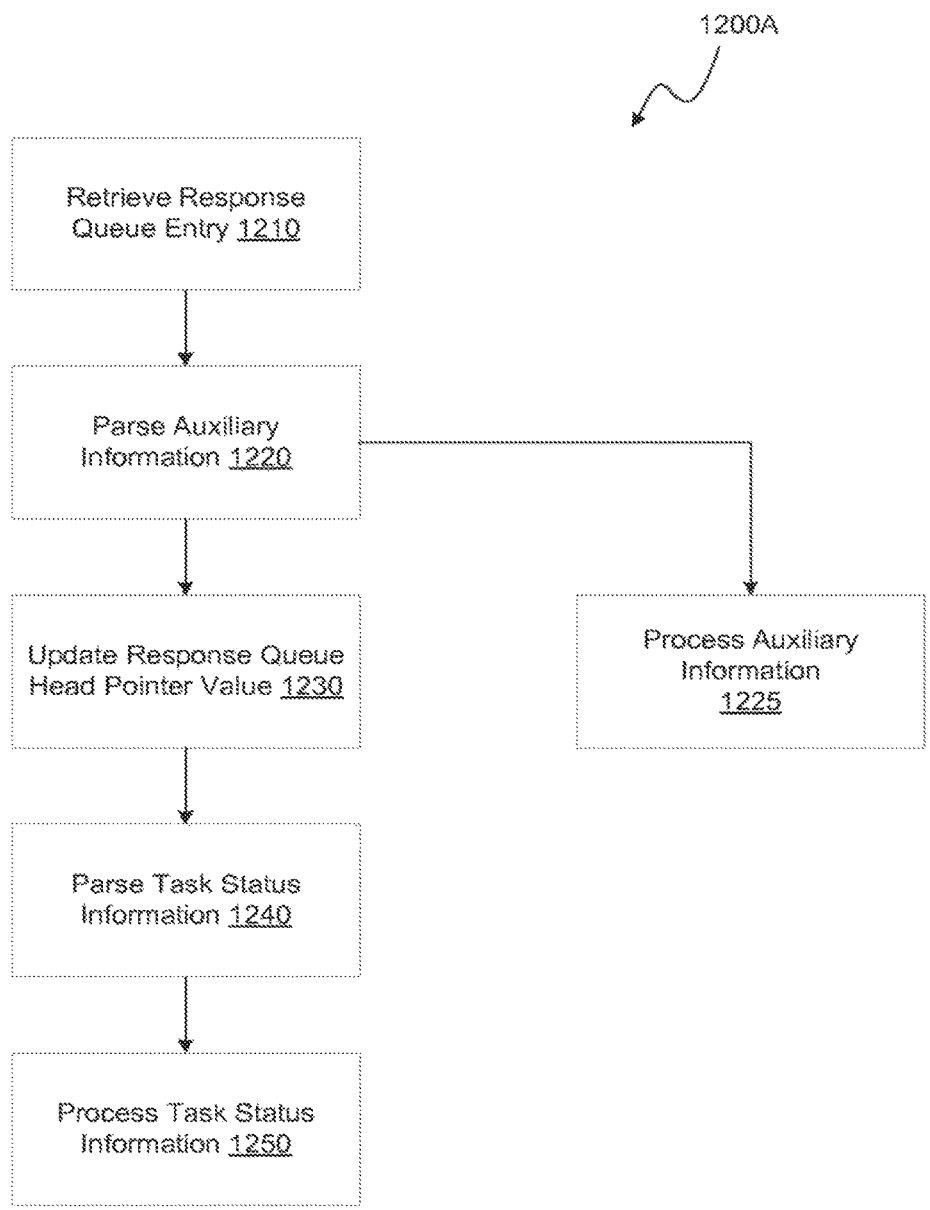
FIG. 12A illustrates, via flowchart, selected details of an exemplary embodiment of a procedure for host utilization of enhanced queue entries.

FIG. 12A illustrates, via flowchart, selected details of an exemplary embodiment of a procedure for host utilization of enhanced queue entries. During operation, the host retrieves (1210) an enhanced response queue word (ERP) from a request queue. Auxiliary information in the ERP is parsed (1220) and processed (1225). Task status information is also parsed (1230) from the ERP and the task status information processed (1240) and the request queue head pointer value updated (1250).

Figure 12B:
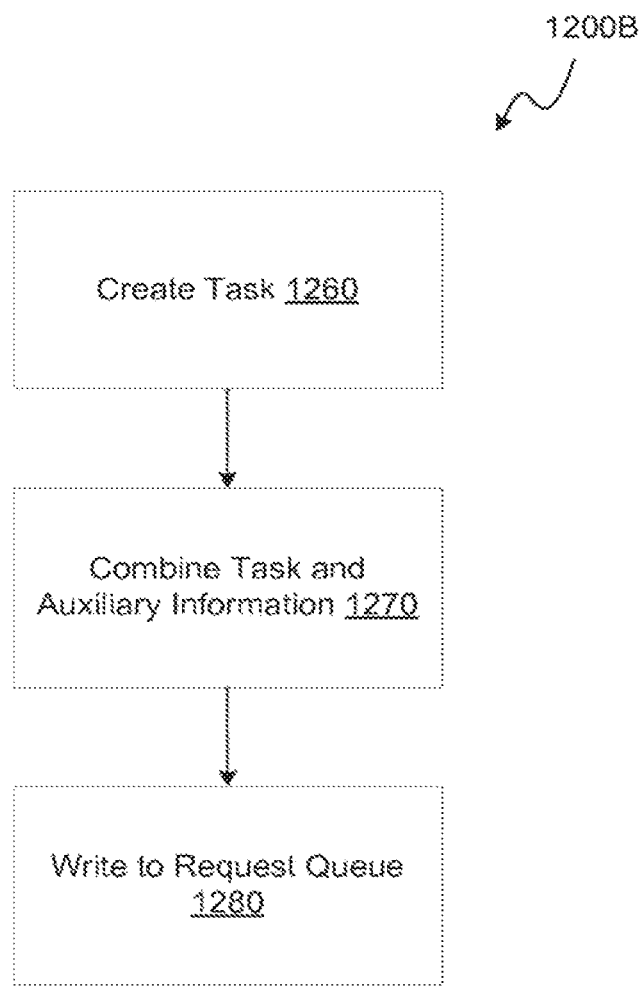
FIG. 12B illustrates, via flowchart, selected details of an exemplary embodiment of a procedure for host creation of enhanced queue entries.

FIG. 12B illustrates, via flowchart, selected details of an exemplary embodiment of a procedure for host creation of enhanced queue entries. A task request is created (1260), task and auxiliary information combined (1270), and written (1280) to a request queue. Auxiliary information comprises pointer information, controller commands, or other information.

Example Implementation Techniques

In some embodiments, various combinations of all or port ions of operations performed by interface circuitry, and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a controller (such as controller 120 described relative to FIG. 1), are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instruct ions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "comprises", "comprising", "includes", and "including" are specifically intended to be construed as abstractions describing logical sets of open-ended (non-restrictive) scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as array sizes, number of conductors and/or detectors depicted, for example), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
    one or more circuits of a controller of a host bus coupled mass storage device configured to:
    exchange one or more data words between a host bus adapter and the host bus coupled mass storage device via one or more predetermined storage locations;
    a first exchanged data word of the one or more data words including queue pointer update information and mass storage device auxiliary control information;
    the first exchanged data word having a first number of bits that is a native data unit width of a host processing element, the queue pointer update information including a second number of bits, the mass storage device auxiliary control information including a third number of bits, and a sum of the second number of bits and the third number of bits being less than or equal to the first number of bits.

2. The system of claim 1, further comprising the one or more predetermined storage locations comprising at least one location in a main memory of a coupled host.

3. The system of claim 1, further comprising the one or more predetermined storage locations comprising at least one location in the mass storage device.

4. The system of claim 1, further comprising the mass storage device being a solid-state-drive (SSD) and the host bus being compatible with at least one version of the PCIe host bus standard.

5. The system of claim 1, further comprising the native data unit width being 32-bits, the first queue pointer update information being a 16-bit queue index information, and the auxiliary control information being 16-bits.

6. The system of claim 1, further comprising the auxiliary control information comprising one of:
    an instruction to the controller of the mass storage device to abort a pending or executing task in the controller of the mass storage device;
    an instruction to alter an arbitration policy of at least one request queue associated with tasks to be performed by the controller of the mass storage device;
    an instruction to affect a servicing order of request queues associated with tasks to be performed by the controller of the mass storage device;
    an instruction to affect the servicing frequency of request queues associated with tasks to be performed by the controller of the mass storage device;
    an instruction to associatively group a series of operations in a request queue associated with tasks to be performed by the controller of the mass storage device; and an instruction to provide queue credit information as part of a credit based method of managing queue servicing by the controller of the mass storage device.

7. The system of claim 1, further comprising the one or more circuits further configured to:
queue tasks to the mass storage device;
parse the first exchanged data word to obtain a first portion having queue pointer update information and a second portion having the auxiliary control information; and
wherein the queue pointer update information is a request queue tail pointer update.

8. The system of claim 1, further comprising the one or more circuits further configured to:
alter a processing of one or more tasks by the mass storage device in response to the auxiliary control information comprised with a request queue tail pointer update in the first exchanged data word.

9. A method comprising:
exchanging a first data word between a host bus adapter and a host bus coupled mass storage device by writing the first data word to a first predetermined storage location, the first data word including a task request and a first mass storage device auxiliary control information;
exchanging a second data word between a host bus coupled mass storage device and a host bus adapter by writing the second data word to a second predetermined storage location, the second data word including a task response and a second mass storage device auxiliary control information;
the first data word and the second data word having a first number of bits that is a native data unit width of a host processing element, the task request including a second number of bits, the task response including a third number of bits, the first mass storage device auxiliary control information including a fourth number of bits, the second mass storage device auxiliary control information including a fifth number of bits, a sum of the second number of bits and the fourth number of bits being less than or equal to the first number of bits and a sum of the third number of bits and the fifth number of bits being less than or equal to the first number of bits.

10. The method of claim 9, further comprising the first predetermined storage location comprising a location in a main memory of a coupled host.

11. The method of claim 9, further comprising the second predetermined storage locations comprising a location in the mass storage device.

12. The method of claim 9, further comprising the mass storage device being a solid-state-drive (SSD) and the host bus being compatible with at least one version of the PCIe host bus standard.

13. The method of claim 9, further comprising the first auxiliary control information comprising priority information indicating priorities of one or more task requests.

14. A computer-readable memory device embodying instructions that, when executed by one or more processors of a host bus coupled mass storage device, cause the one or more processors to:
exchange one or more data words between a host bus adapter and a host bus coupled mass storage device via one or more predetermined storage locations;
a first exchanged data word of the one or more data words including queue pointer update information and mass storage device auxiliary control information;
the first exchanged data word having a first number of bits that is a native data unit width of a host processing element, the queue pointer update information including a second number of bits, the mass storage device auxiliary control information including a third number of bits, and a sum of the second number of bits and the third number of bits being less than or equal to the first number of bits.

15. The computer-readable memory device of claim 14, further comprising the one or more predetermined storage locations comprising at least one location in a main memory of a coupled host.

16. The computer-readable memory device of claim 14, further comprising the one or more predetermined storage locations comprising at least one location in the mass storage device.

17. The computer-readable memory device of claim 14, further comprising the mass storage device being a solid-state-drive (SSD) and the host bus being compatible with at least one version of the PCIe host bus standard.

18. The computer-readable memory device of claim 14, further comprising the native data unit width being 32-bits, the queue pointer update information beings 16-bit queue index information, and the auxiliary control information being 16-bits.

19. The computer-readable memory device of claim 14, further comprising the auxiliary control information being an instruction to abort a pending or executing task in a controller of the mass storage device.

20. The computer-readable memory device of claim 14, further comprising the auxiliary control information being an instruction to alter the arbitration policy for at least one request queue associated with tasks to be performed by a controller of the mass storage device.

* * * * *